(12) United States Patent
Uchida et al.

(10) Patent No.: US 8,737,215 B2
(45) Date of Patent: May 27, 2014

(54) PACKET FORWARDING APPARATUS, COMMUNICATION SYSTEM, PROCESS RULE UPDATE METHOD, AND PROGRAM

(75) Inventors: Satoshi Uchida, Tokyo (JP); Norihito Fujita, Tokyo (JP); Yasuhiro Yamasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 143 days.

(21) Appl. No.: 13/191,341

(22) Filed: Jul. 26, 2011

(65) Prior Publication Data

US 2011/0310901 A1   Dec. 22, 2011

Related U.S. Application Data

(63) Continuation of application No. PCT/JP2011/053025, filed on Feb. 14, 2011.

(30) Foreign Application Priority Data

Feb. 16, 2010   (JP) ................................. 2010-031522

(51) Int. Cl.
  *H04L 12/26*   (2006.01)
(52) U.S. Cl.
  USPC ............................ 370/231; 370/235; 370/392
(58) Field of Classification Search
  None
  See application file for complete search history.

(56) References Cited

U.S. PATENT DOCUMENTS

2005/0198224 A1\* 9/2005 Kobayashi et al. ........... 709/220
2006/0256784 A1\* 11/2006 Feng et al. .................... 370/381
2007/0011740 A1\* 1/2007 Davis et al. ..................... 726/22
2007/0255861 A1\* 11/2007 Kain et al. ........................ 710/8
2010/0027436 A1   2/2010 Yamasaki
2010/0299753 A1\* 11/2010 Yoo ................................. 726/22
2011/0238975 A1\* 9/2011 Amemiya et al. ............ 713/150

FOREIGN PATENT DOCUMENTS

JP           2011-24179 A    2/2011
WO    WO 2008/108403 A1    9/2008

OTHER PUBLICATIONS

Nick McKeown and seven others, "OpenFlow: Enabling Innovation in Campus Networks", [online], searched on Dec. 22, 2009, Internet <URL:http://www.openflowswitch.org//documents/openflow-wp-latest.pdf>, Mar. 14, 2008.
"OpenFlow Switch Specification" Version 0.9.0. (Wire Protocol 0×98), searched on Dec. 22, 2009, Internet <URL:http://www.openflowswitch.org/documents/openflow-spec-v0.9.0.pdf>, Jul. 20, 2009.
"OpenFlow Switch Specification" Version 1.0.0. (Wire Protocol 0×01), Dec. 31, 2009.
Kisu Kim et al., "Japanese Content classification of HTTP Traffic", DIC0M02009, Jul. 1, 2009, vol. 2009 No. 1, pp. 518-522.
Hiroshi Ueno et al., "A study on Deployment of Network . . . ", CPSY2009-36, Nov. 13, 2009, vol. 109, No. 296, pp. 7-12.

\* cited by examiner

*Primary Examiner* — Otis L Thompson, Jr.
(74) *Attorney, Agent, or Firm* — McGinn IP Law Group, PLLC

(57) ABSTRACT

A packet forwarding apparatus, a communication system, and a process rule update method that can accurately delete process rules used for packet forwarding and the like include a process rule storage unit that stores process rules defining a process content for each flow; a packet process unit that executes processing a received a packet by using a process rule matching the received packet among the process rules and; an end determination information extraction unit that extracts information for checking a flow end from the received packet; and a flow end check unit that deletes, when a flow end is checked based on the extracted information, a process rule corresponding to the flow.

19 Claims, 21 Drawing Sheets

FIG. 9

192.168.0.10 → 192.168.1.10 : SYN (ARP)

| INGRESS PORT | IP | | | ACTIONS | FIN | REVERSE FIN | TIME OUT |
| --- | --- | --- | --- | --- | --- | --- | --- |
| | SOURCE ADDRESS | DESTINATION ADDRESS | PROTOCOL TYPE | | | | |
| 1 | 192.168.0.10 | 192.168.1.10 | 0x0006 | Modify-field IP-src 192.168.1.1 Forward Port 2 | | | |

FIG. 10

192.168.1.10 → 192.168.1.1 : SYN /ACK (ARP)

| INGRESS PORT | IP | | | ACTIONS | FIN | REVERSE FIN | TIME OUT |
|---|---|---|---|---|---|---|---|
| | SOURCE ADDRESS | DESTINATION ADDRESS | PROTOCOL TYPE | | | | |
| 1 | 192.168.0.10 | 192.168.1.10 | 0x0006 | Modify-field IP-src 192.168.1.1 Forward Port 2 | | | |
| 2 | 192.168.1.10 | 192.168.1.1 | 0x0006 | Modify-field IP-src 192.168.0.10 Forward Port 1 | | | |

FIG. 11

192.168.0.10 → 192.168.1.10 : FIN

| INGRESS PORT | IP | | | ACTIONS | FIN | REVERSE FIN | TIME OUT |
| --- | --- | --- | --- | --- | --- | --- | --- |
| | SOURCE ADDRESS | DESTINATION ADDRESS | PROTOCOL TYPE | | | | |
| 1 | 192.168.0.10 | 192.168.1.10 | 0x0006 | Modify-field IP-src 192.168.1.1 Forward Port 2 | ✓ | | |
| 2 | 192.168.1.10 | 192.168.1.1 | 0x0006 | Modify-field IP-src 192.168.0.10 Forward Port 1 | | ✓ | |

FIG. 12

192.168.0.10 → 192.168.1.1 : FIN (AFTER ACK)

| INGRESS PORT | IP | | | ACTIONS | FIN | REVERSE FIN | TIME OUT |
| --- | --- | --- | --- | --- | --- | --- | --- |
| | SOURCE ADDRESS | DESTINATION ADDRESS | PROTOCOL TYPE | | | | |
| 1 | 192.168.0.10 | 192.168.1.10 | 0x0006 | Modify-field IP-src 192.168.1.1 Forward Port 2 | ✓ | ✓ | 2SML |
| 2 | 192.168.1.10 | 192.168.1.1 | 0x0006 | Modify-field IP-src 192.168.0.10 Forward Port 1 | ✓ | ✓ | 2SML |

FIG. 13

AFTER TIMEOUT

| INGRESS PORT | IP | | | ACTIONS | FIN | REVERSE FIN | TIME OUT |
|---|---|---|---|---|---|---|---|
| | SOURCE ADDRESS | DESTINATION ADDRESS | PROTOCOL TYPE | | | | |

FIG. 15

192.168.0.10 → 192.168.1.1 : SYN

| INGRESS PORT | IP | | | ACTIONS | SYN | TIME OUT |
| --- | --- | --- | --- | --- | --- | --- |
| | SOURCE ADDRESS | DESTINATION ADDRESS | PROTOCOL TYPE | | | |
| 1 | 192.168.0.10 | 192.168.1.10 | 0x0006 | Modify-field IP-src 192.168.1.1 Forward Port 2 | ∟ | 2SML |
| : | : | : | : | : | : | : |

PRIOR ART

FIG. 20

| INGRESS PORT | IP | | | TCP/UDP | DURATION TIME | PROCESS CONTENTS ( ACTIONS ) |
| | SOURCE ADDRESS | DESTINATION ADDRESS | PROTOCOL TYPE | DESTINATION PORT | | |
|---|---|---|---|---|---|---|
| 1 | 192.168.0.* | 192.168.1.* | 0x0006 | 80 | 10.1 | Modify-field IP-src 192.168.1.1 Forward Port 2 |
| 1 | 192.168.0.* | 192.168.1.* | * | Not 80 | 12.1 | Modify-field IP-src 192.168.1.1 Forward Port 3 |
| . . . | . . . | . . . | . . . | . . . | . . . | . . . |

PRIOR ART

FIG. 21

| ACTION NAMES | ACTION CONTENTS |
|---|---|
| OUTPUT | OUTPUT TO SPECIFIED PORT |
| SET_VLAN_VID | USE SPECIFIED VLAN ID TO ADD/ UPDATE VLAN Tag |
| SET_VLAN_PCP | USE SPECIFIED VLAN Priority TO ADD/ UPDATE VLAN Tag |
| STRIP_VLAN | STRIP IEEE802.1q VLAN Tag |
| SET_DL_SRC | UPDATE MAC SA |
| SET_DL_DST | UPDATE MAC DA |
| SET_NW_SRC | UPDATE IP SA |
| SET_NW_DST | UPDATE IP DA |
| SET_TP_SRC | UPDATE TCP/UDP SOURCE PORT |
| SET_TP_DST | UPDATE TCP/UDP DESTINATION PORT |
| VENDOR | VENDER-DEFINED ACTION |

# PACKET FORWARDING APPARATUS, COMMUNICATION SYSTEM, PROCESS RULE UPDATE METHOD, AND PROGRAM

REFERENCE TO RELATED APPLICATION

This application is a continuation of International Application No. PCT/JP2011/053025, filed on Feb. 14, 2011, and claims priority to Japanese Patent Application No. 2010-031522 filed on Feb. 16, 2010, both of which are incorporated herein by reference in their entireties.

TECHNICAL FIELD

The present invention relates to a packet forwarding apparatus, a communication system, a process rule update method, and a computer program. In particular, it relates to a packet forwarding apparatus, a communication system, a process rule update method, and a computer program for processing a received packet in accordance with a process rule matching the received packet.

BACKGROUND

In recent years, a technique referred to as OpenFlow is proposed (see Non-Patent Document 1). In OpenFlow, communication is deemed as an end-to-end flow, and routing control, failure recovery, load distribution, and optimization are executed for each flow. FIG. 18 is a conceptual diagram of an OpenFlow switch. The OpenFlow switch, which serves as a forwarding node, includes a secure channel for communication with an OpenFlow controller serving as a control apparatus. The OpenFlow switch operates in accordance with a flow table appropriately added or rewritten by the OpenFlow controller. In the flow table, a group of: matching rules (header fields) matched against packet headers; actions defining process contents; and flow statistics information (counters) is defined for each flow (see FIGS. 19 and 20).

FIG. 21 illustrates action names and action contents defined in Non-Patent Document 2. OUTPUT is an action for outputting data to a specified port (interface). SET_VLAN_VID to SET_TP_DST are actions for modifying packet header fields.

For example, upon receiving a packet, the OpenFlow switch searches the flow table for an entry having matching rules (see header fields in FIGS. 19 and 20) that match header information of the received packet. As a result of the search, if an entry matching the received packet is found, the OpenFlow switch executes process contents described in action fields of the entry on the received packet. If, as a result of the search, no entry matching the received packet is found, the OpenFlow switch forwards the received packet to the OpenFlow controller via the secure channel to request the OpenFlow controller to determine a packet route based on the source/destination of the received packet. Upon receiving a flow entry realizing the route, the OpenFlow switch updates the flow table. In this way, the OpenFlow switch uses an entry stored in the flow table as a process rule to forward a packet.
Non-Patent Document 1: Nick McKeown and seven others, "OpenFlow: Enabling Innovation in Campus Networks", [online], searched on Dec. 22, 2009, Internet <URL:http://www.openflowswitch.org//documents/openflow-wp-latest.pdf>
Non-Patent Document 2: "OpenFlow Switch Specification" Version 0.9.0. (Wire Protocol 0x98), searched on Dec. 22, 2009, Internet <URL:http://www.openflowswitch.org/documents/openflow-spec-v0.9.0.pdf>

SUMMARY

The following analyses are made by the present inventor. According to the above Non-Patent Documents 1 and 2, if a flow entry (hereinafter, information that is equivalent to the flow entry in Non-Patent Documents 1 and 2 and that the packet forwarding apparatus refers to when determining a process executed on a received packet will be referred to as a process rule) is set by the controller at the start of communication and if a corresponding packet is not received during a period indicated by a separately set expiration time (the duration time in FIG. 19), the corresponding entry is deleted (see "Idle_Timeout and Hard_Timeout" on page 24 in Non-Patent Document 2).

Namely, according to Non-Patent Documents 1 and 2, even if the communication is ended, the process rule continues to remain in the flow table until the expiration time. Thus, a storage region for process rules is unnecessarily used, counted as a problem. In addition, such process rule on which the end of communication has already been determined is a cause of decreasing the efficiency in searching for a process rule matching a received packet in the packet forwarding apparatus.

In addition, if the number of such remaining process rules is many and insufficiency is caused in the process rule storage region, a necessary number of process rules needs to be deleted based on a certain rule. For example, if a rule in which newer process rules are allowed to remain and older process rules are deleted is used, newer process rules on which the end of communication has already been determined may be allowed to remain, whereas effective process rules on which the end of communication has not been determined yet may be deleted.

The present invention has been made in view of the above circumstances, and it is an object of the present invention to provide a packet forwarding apparatus, a communication system, a process rule update method, and a program that can accurately delete the above process rules.

According to a first aspect of the present invention, there is provided a packet forwarding apparatus comprising: a process rule storage unit that stores process rules defining a process content for each flow; a packet process unit that executes processing a received packet by using a process rule matching the received packet among the process rules and; an end determination information extraction unit that extracts information for checking a flow end from the received packet; and a flow end check unit that deletes, when a flow end is checked based on the extracted information, a process rule corresponding to the flow.

According to a second aspect of the present invention, there is provided a communication system comprising: the above packet forwarding apparatus; and a control apparatus setting a process rule in the packet forwarding apparatus.

According to a third aspect of the present invention, there is provided a process rule update method causing a packet forwarding apparatus comprising: a process rule storage unit that stores process rules defining a process content for each flow; and a packet process unit that executes and processing a received packet by using a process rule matching the received packet among the process rules to execute: extracting information for checking a flow end from the received packet; and deleting, when a flow end is checked based on the extracted information, a process rule corresponding to the flow from the process rule storage unit. The present method is connected to a certain machine referred to as a packet forwarding apparatus comprising a process rule storage unit and a packet process unit.

According to a fourth aspect of the present invention, there is provided a program, causing a computer forming a packet forwarding apparatus comprising: a process rule storage unit that stores process rules defining a process content for each flow; and a packet process unit that executes processing a received packet by using a process rule matching a received packet among the process rules to execute the processes of: extracting information for determining a flow end from the received packet; and deleting, when a flow end is determined based on the extracted information, a process rule corresponding to the flow from the process rule storage unit. The program can be stored in a computer-readable recording medium. Namely, the present invention can be realized as a computer program product. Also the program may be regarded as either a program product (i.e. manufacture) or a process embodying the load distribution method (process), expressed in a program language.

The meritorious effects of the present invention are summarized as follows, however, without restriction thereto.

According to the present invention, even if a process rule has not been expired yet, if a communication end is determined and the process rule becomes unnecessary, the process rule can be deleted from the process rule storage unit of the packet forwarding apparatus. This is because the present invention includes a function of extracting information for determining a flow end (communication end) from a received packet to determine a flow end (communication end).

BRIEF DESCRIPTION OF THE DRAWINGS

FIG. 9 illustrates storage contents of a process rule storage unit of a packet forwarding apparatus in a stepwise manner.

FIG. 10 illustrates an operation subsequent to FIG. 9.

FIG. 11 illustrates an operation subsequent to FIG. 10.

FIG. 12 illustrates an operation subsequent to FIG. 11.

FIG. 13 illustrates an operation subsequent to FIG. 12.

FIG. 15 illustrates storage contents of a process rule storage unit of a packet forwarding apparatus according to the second specific example in a stepwise manner.

FIG. 20 illustrates a specific example of a flow table of the OpenFlow switch in Non-Patent Documents 1 and 2.

FIG. 21 illustrates action examples in Non-Patent Document 2.

PREFERRED MODES

Figure 1:
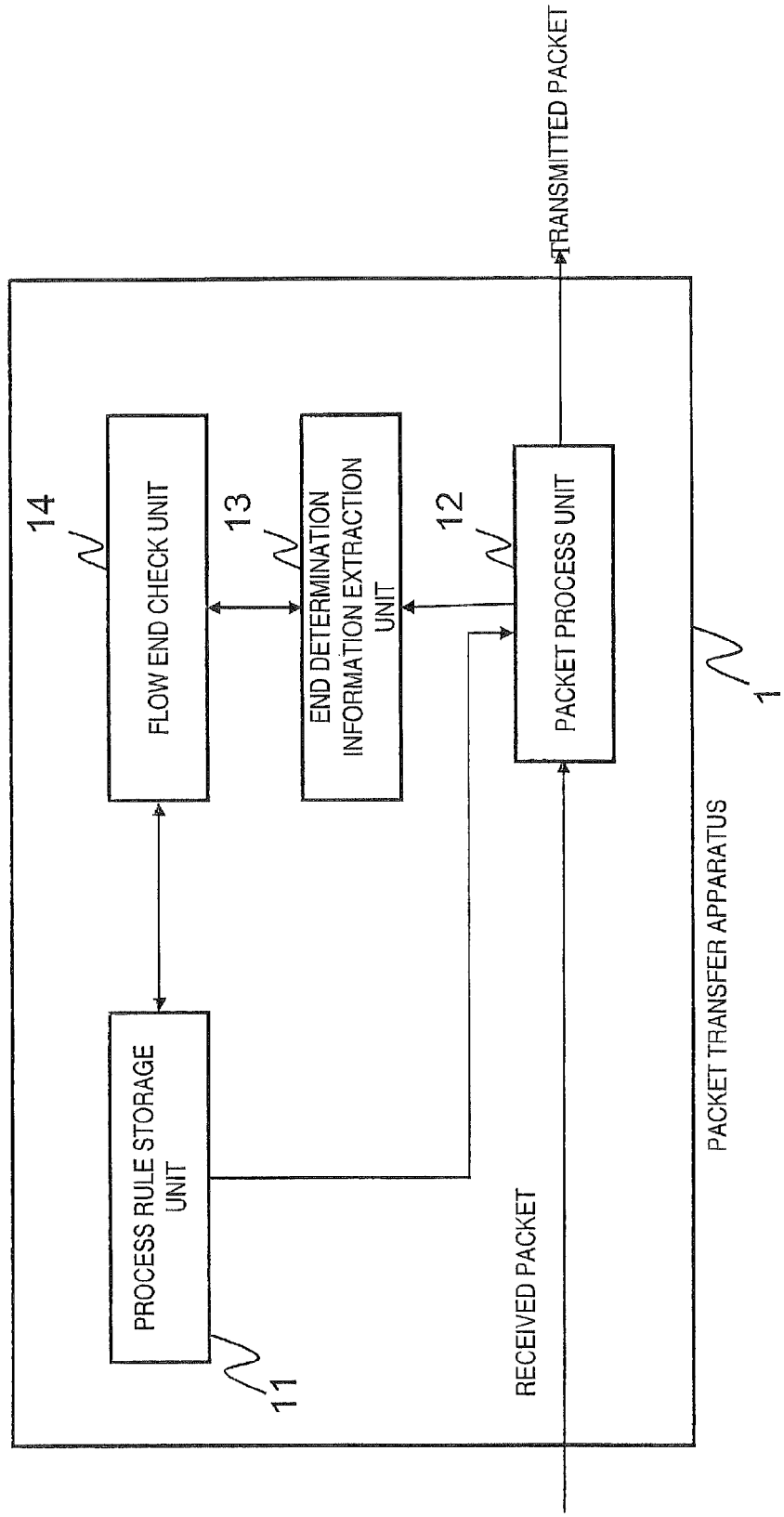
FIG. 1 is a block diagram illustrating an outline of the present invention.

First, an outline of an exemplary embodiment of the present invention will be described. Hereinafter, the reference characters used in this outline are used only as examples to facilitate comprehension and are not intended to limit the present invention to the illustrated modes. As illustrated in FIG. 1, a packet forwarding apparatus 1 according to an exemplary embodiment of the present invention includes: a process rule storage unit 11 storing process rules applied to received packets; a packet process unit 12 reading a process rule matching a received packet from the process rule storage unit to execute a forwarding process or the like; an end determination information extraction unit 13 extracting information for checking a flow end from a received packet; and a flow end check unit 14 deleting, when a flow end is checked based on the extracted information, a process rule corresponding to the flow.

A flow end can be detected by various methods as below. For example, in one method, a protocol end message is checked. For example, in the TCP (Transmission Control Protocol), a FIN flag is checked. In this way, the end of communication, that is, the end of a flow using communication, can be detected. In practice, after a FIN flag, communication with an ACK packet is generated in a reverse-direction flow (a flow in which the source and the destination are reversed). Thus, by detecting the ACK flag in the reverse-direction flow after the FIN packet, a flow end can be determined. Further, since the TCP is used in bidirectional communication, the forward- and reverse-direction flows can be used as a pair to determine a flow end. Namely, if the end of a flow is detected, a process rule corresponding to the reverse-direction flow of the flow can also be determined to be unnecessary. Alternatively, a communication end can also be determined when a predetermined time elapses after reception of a SYN packet and a timeout is determined. Still alternatively, a communication end can be determined by reception of a RST packet. These methods will be described in more detail later as specific examples.

In another example, a flow end can be detected based on the E-bit in a DATA chunk in the SCTP (Stream Control Transmission Protocol).

Further, in another example, a flow end can be detected based on the HTTP (Hypertext Transfer Protocol). When a Connection attribute in an HTTP header detects Close and forwarding of a corresponding HTTP message is confirmed, it is determined that a series of flows has ended.

Further, in another example, a flow end can be detected based on the IP (Internet Protocol). In an environment where a packet train is deemed as a single flow, since a packet end can be determined by an IP MF (More Fragments) flag, a flow end can be determined.

In any case, by causing the end determination information extraction unit 13 to extract relevant information and transmit the information to the flow end check unit 14, whether the process rule is unnecessary can be determined. In this way, an unnecessary process rule can be deleted.

Thus, once a communication end is determined, the corresponding process rule can be deleted even before the expiration time thereof. As a result, more space is ensured in the storage region of the process rule storage unit, and the efficiency in searching for a process rule is increased. In addition, since necessary process rules are less likely to be deleted, the traffic or load required for resetting process rules can be reduced. Further, when process rule update control is executed to assure QoS or the like, unnecessary process rules can be eliminated from the control.

According to the present invention, the following modes are possible.

[Mode 1]

The packet forwarding apparatus according to the first aspect.

[Mode 2]

It is preferable that the packet forwarding apparatus further comprise: a timeout determination unit that executes a timeout determination on a process rule stored in the process rule storage unit. In addition, it is preferable that the flow end check unit cause the timeout determination unit to start a timeout determination based on the information extracted by the end determination information extraction unit and delete a process rule on which a timeout is determined by the timeout determination unit.

[Mode 3]

The packet forwarding apparatus further comprises a packet storage unit that stores a received packet. In addition, the packet forwarding apparatus can cause the end determination information extraction unit to extract, from the packet storage unit, information for identifying process rules corresponding to a flow to which a received packet belongs and a reverse-direction flow of the flow, respectively, and can cause the flow end check unit to determine whether to delete the process rules in both directions.

[Mode 4]

The flow end check unit can use at least one of a TCP (Transmission Control Protocol) FIN flag, RST flag, and SYN flag extracted by the end determination information extraction unit to determine a flow end.

[Mode 5]

The communication system according to the second aspect.

[Mode 6]

The process rule update method according to the third aspect.

[Mode 7]

It is preferable that, in the process rule update method, the packet forwarding apparatus start a timeout determination based on the information for checking a flow end and delete a process rule on which a timeout is determined.

[Mode 8]

In the process rule update method, it is preferable that the packet forwarding apparatus extract information for identifying process rules corresponding to a flow to which a received packet belongs and a reverse-direction flow of the flow from the received packet and a received packet modified in accordance with the process rule, respectively, and determine whether to delete the process rules in both directions.

[Mode 9]

In the process rule update method, a flow end can be determined by at least one of a TCP (Transmission Control Protocol) FIN flag, RST flag, and SYN flag.

[Mode 10]

The program according to the fourth aspect.

As with the case of the communication system in mode 1, the above communication system and program according to the second and fourth aspects can be extended to the contents in modes 2 to 4.

In the following exemplary embodiments are illustrated in more detail with reference to the drawings.

First Exemplary Embodiment

Next, a first exemplary embodiment of the present invention will be described in detail with reference to the drawings.

First, terms will be defined. A "flow" signifies communication from a certain source to destination. Namely, a "flow" signifies a group of forwarded packets or the forwarding itself. Each of the "source" and "destination" does not necessarily signify a single physical or logical address. Namely, communication from a certain subnet to a different subnet may be collectively deemed as a single flow. Thus, a flow may be a collection of more detailed flows, one example of which corresponds to a flow entry in which a plurality of flows are unified by describing part of destination addresses, source addresses, or the like with wildcards, as in the case of Open-Flow in Non-Patent Documents 1 and 2.

Figure 2:
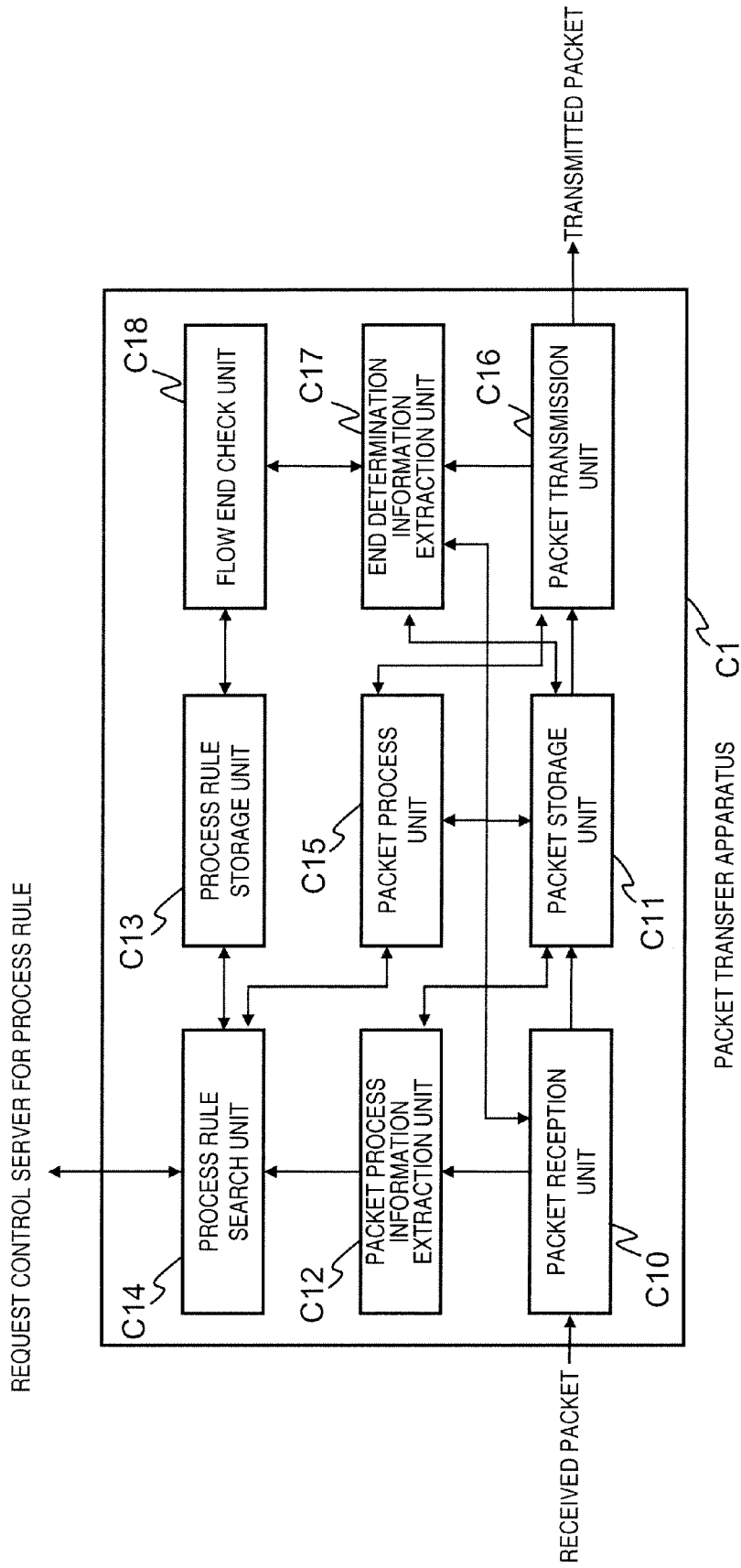
FIG. 2 is a block diagram of a configuration according to a first exemplary embodiment of the present invention.

FIG. 2 is a block diagram of a configuration according to a first exemplary embodiment of the present invention. In FIG. 2, a packet forwarding apparatus C1 according to the present exemplary embodiment includes a packet reception unit C10, a packet storage unit C11, a packet process information extraction unit C12, a process rule storage unit C13, a process rule search unit C14, a packet process unit C15, a packet forwarding unit C16, an end determination information extraction unit C17, and a flow end check unit C18.

The packet reception unit C10 receives a packet from another node and temporarily stores the received packet in the packet storage unit C11. In addition, the packet reception unit C10 can store reception status information representing an ingress port (receiving port ID information) and the like simultaneously. After storing the received packet, the packet reception unit C10 notifies the packet process information extraction unit C12 and the end determination information extraction unit C17 of reception of the packet.

Until the packet forwarding unit C16 transmits the packet received by the packet reception unit C10, the packet storage unit C11 temporarily stores the packet.

When notified of reception of the packet by the packet reception unit C10, to determine process contents to be applied to the packet, the packet process information extraction unit C12 uses the notification as a trigger to extract header field information and reception status information (the above ingress port (receiving port ID information) and the like) about the received packet from the packet storage unit C11. The packet process information extraction unit C12 outputs the extracted packet information to the process rule search unit C14.

As the information to be extracted to determine the process contents to be applied to the received packet by the packet process information extraction unit C12, information identical to that used in an OpenFlow switch in Non-Patent Documents 1 and 2 can be used. For example, the following information can be used: an ingress port (receiving port ID information); a source address, a destination address, and an upper protocol type of Ethernet (registered trademark); a VID (VLAN-ID) and a PCP (Priority Code Point) in TCI (Tag Control Information) of an IEEE802.1 Q-compliant VLAN (Virtual LAN); a source address, a destination address, and an upper protocol type of the IP (Internet Protocol); and a source port and a destination port of the TCP (Transmission Control Protocol) or the UDP (User Datagram Protocol). Among the above information, the ingress port (receiving port ID information) of the packet forwarding apparatus can be obtained from the reception status information, and the other information can be obtained from header fields of the received packet, upper protocol headers of the packet, or the like.

Figure 18:
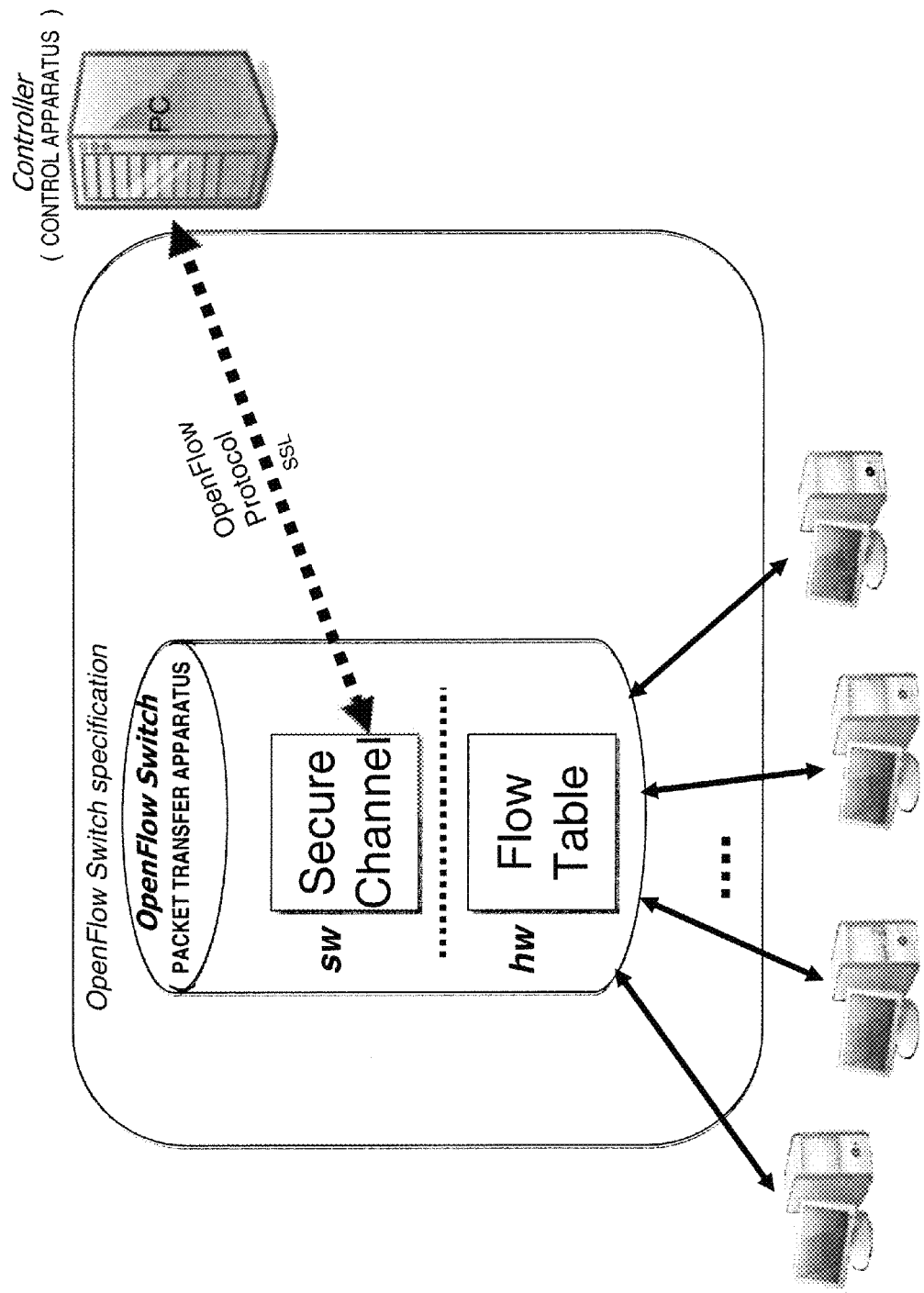
FIG. 18 is a conceptual diagram of an OpenFlow switch in Non-Patent Documents 1 and 2.

For each flow, the process rule storage unit C13 stores a process rule defining process contents applied to a received packet. The process rule includes contents similar to those in a flow table in Non-Patent Documents 1 and 2 in FIGS. 18 and 19. The process rule may be an entry, in which header fields that are matched against a received packet to determine the flow; statistics information (counters); and process contents (actions) are associated with each other.

Figure 19:
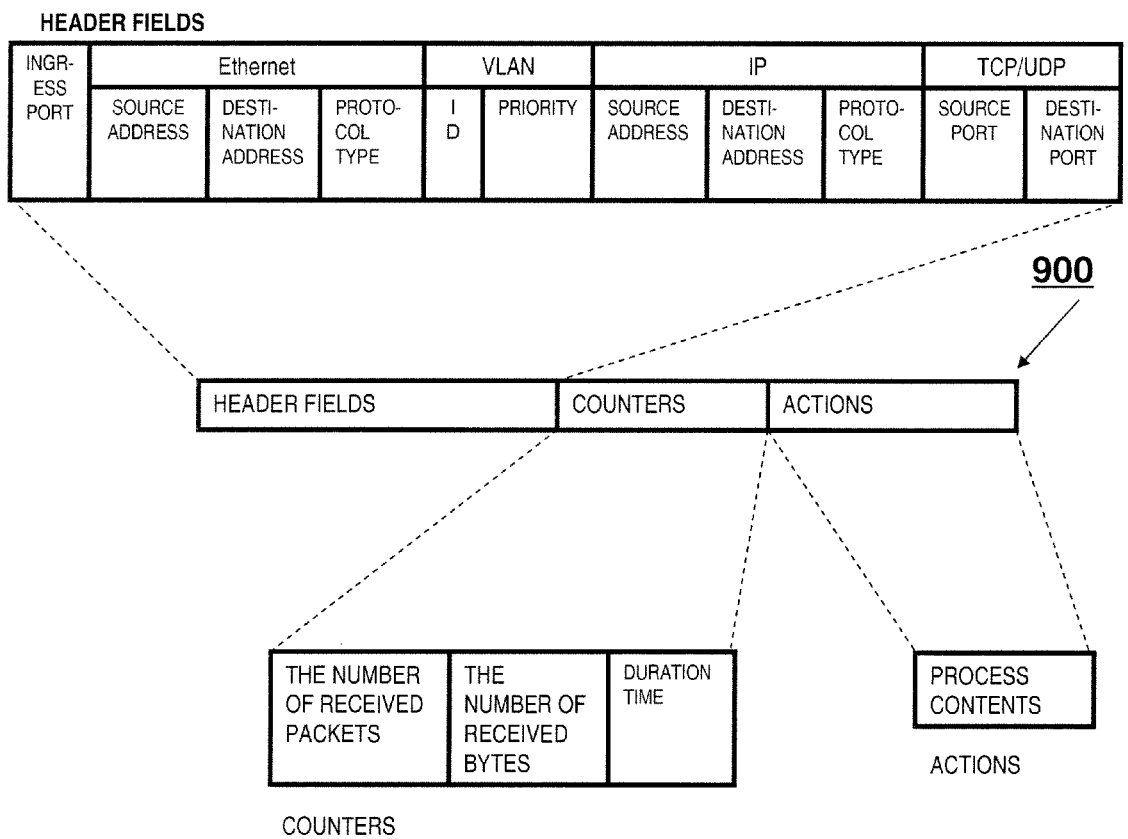
FIG. 19 illustrates a configuration of a flow entry of the OpenFlow switch in Non-Patent Documents 1 and 2.

For example, the header fields in FIG. 19 include: an ingress port of the packet forwarding apparatus; a source address, a destination address, and an upper protocol type of Ethernet (registered trademark); a VID and a priority (PCP; Priority Code Point) of an IEEE802.1 Q-compliant VLAN; a source address, a destination address, and an upper protocol type of the IP; and a source port and a destination port of the TCP or the UDP. When a packet matching the contents of these header fields is received, process contents defined in the action field are executed. However, wildcards can be used in arbitrary information bits in the header fields.

Further, the counters (fields) in FIG. 19 hold the number of received packets, the number of received bytes, and the rule duration time, which are used as statistics information about the flow to which the packet belongs.

In addition, in the actions in FIG. 19, "Forward" for forwarding the packet, "Drop" for dropping the packet, and "Modify-Field" for modifying information about the packet are present. An arbitrary number of actions can be registered in the actions (see the list in FIG. 21. However, in the case of Non-Patent Document 2, if the action field is blank, "Drop" is executed). For example, the Modify-Filed actions include: setting/changing of a VLAN ID or priority; stripping of a VLAN header; changing of an Ethernet (registered trademark) or IP source/destination address; and changing of a TCP/UDP source/destination port (other examples include changing of an IP ToS (Type of Service) field).

Further, in the present exemplary embodiment, for each process rule, the process rule storage unit C13 includes internal state information fields, which will be described later, used by the flow end check unit C18 to determine a flow end (see FIN, reverse FIN, and timeout in FIG. 9 and SYN and timeout in FIG. 15).

The process rule search unit C14 determines actions (process contents) to be applied to the received packet, based on the information transmitted from the packet process information extraction unit C12 and outputs the actions to the packet process unit C15. More specifically, the process rule search unit C14 searches the process rule storage unit C13 for a process rule matching the information extracted from the received packet transmitted from the packet process information extraction unit C12 and outputs the process rule to the packet process unit C15. If a process rule matching the received packet exists, the process rule search unit C14 extracts actions (process contents) defined in the action field of the process rule and outputs the actions to the packet process unit C15. If no process rule matching the received packet is found, the process rule search unit C14 transmits the received packet or information extracted from the received packet to a predetermined control apparatus (controller; see FIG. 18) to request creation and transmission of a process rule. Upon receiving a process rule from the predetermined control apparatus (controller; see FIG. 18), the process rule search unit C14 registers the received process rule in the process rule storage unit C13. Next, the process rule search unit C14 extracts actions (process contents) from the process rule and outputs the actions to the packet process unit C15.

The first process rule in the flow table in FIG. 20 is applied to packets indicating that the physical port number of the packet forwarding apparatus is 1; the source network is 192.168.0./24; the protocol type is 0x0006 (TCP); the destination network is 192.168.1./24; and the TCP destination port number is 80. Accordingly, the actions (process contents) of changing the IP source address of the packet to 192.168.1/24 and transmitting the packet from physical port number 2 of the forwarding apparatus are executed. Similarly, the second process rule in FIG. 20 is applied to packets indicating a destination port number other than HTTP port numbers. Accordingly, the actions (process contents) of changing the IP source address of the packet to 192.168.1/24 and transmitting the packet from physical port number 3 of the forwarding apparatus are executed.

The packet process unit C15 processes a received packet stored in the packet storage unit C11 in accordance with the actions (process contents) outputted from the process rule search unit C14. For example, upon receiving a Forward action for forwarding a packet, the packet process unit C15 requests the packet forwarding unit C16 to transmit the packet. In addition to the actions (process contents) outputted from the process rule search unit C14, the packet process unit C15 appropriately executes basic processes and the like relating to communication. For example, in the case of the first process rule in FIG. 20, the packet process unit C15 first changes the source IP address to 192.168.1.1 and next transmits the packet, as the actions (process contents). Simultaneously, as basic processes relating to communication, the packet process unit C15 also executes basic processes relating to the IP and the like, such as rewriting of the TTL (Time To Live) field, the checksum field, and the like in the IP headers, as needed. The basic processes relating to communication include determining the end of packet forwarding when the TTL value reaches 0 or the like.

When requested by the packet process unit C15 to execute packet forwarding, the packet forwarding unit C16 reads a packet from the packet storage unit C11 and transmits the packet from a port specified by the packet process unit C15. Further, the packet forwarding unit C16 notifies the end determination information extraction unit C17 of forwarding of the packet.

When notified by the packet reception unit C10 of reception of the packet, the end determination information extraction unit C17 uses the notification as a trigger to extract certain information in the packet, which may include information necessary for determining a flow end, from the packet storage unit C11. In addition, as does the packet process information extraction unit C12, to determine process contents to be applied to the packet, the end determination information extraction unit C17 extracts header field information and reception status information (the above ingress port (receiving port ID information) and the like) about the received packet from the received packet. Further, if it is determined that the certain information in the packet includes information necessary for determining a flow end and if the end determination information extraction unit C17 is notified by the packet forwarding unit C16 of forwarding of the packet, the end determination information extraction unit C17 uses the notification as a trigger to output the information for determining process contents to be applied to the packet (header field information and reception status information (ingress port and the like) about the received packet) and the information determined to be necessary for determining a flow end to the flow end check unit C18.

In the example in FIG. 2, the packet process information extraction unit C12 and the end determination information extraction unit C17 are arranged separately. However, since there are cases where these units C12 and C17 extract identical information under identical conditions, the units C12 and C17 may be integrated. In addition, the end determination information extraction unit C17 may be configured to extract the information for determining process contents to be applied to the received packet only when it is determined that the certain information in the packet includes the information necessary for determining a flow end.

The flow end check unit C18 determines whether the final packet as a flow end has been transmitted, based on the information transmitted from the end determination information extraction unit C17. If it is determined that the final packet has been transmitted, the flow end check unit C18 deletes the process rule corresponding to the flow to which the transmitted packet belongs from the process rule storage unit C13. For this determination, the flow end check unit C18 refers to or updates the internal state information fields in the process rule stored in the process rule storage unit C13, as needed.

For example, the internal state information fields referred to or updated by the flow end check unit C18 include end determination stage information (determination stage information) and elapsed time information after a stage change (after a determination stage change) (see FIN, reverse FIN, and timeout in FIG. 9 and SYN and timeout in FIG. 15).

The individual units (process means) of the packet forwarding apparatus C1 in FIG. 2 can be realized by computer programs causing a computer forming the packet forwarding apparatus C1 to use hardware thereof and execute the respective processes as described above.

Next, operations from packet reception to packet forwarding executed by the packet forwarding apparatus C1 according to the present exemplary embodiment will be described in detail with reference to a flow chart in FIG. 3.

Figure 3:
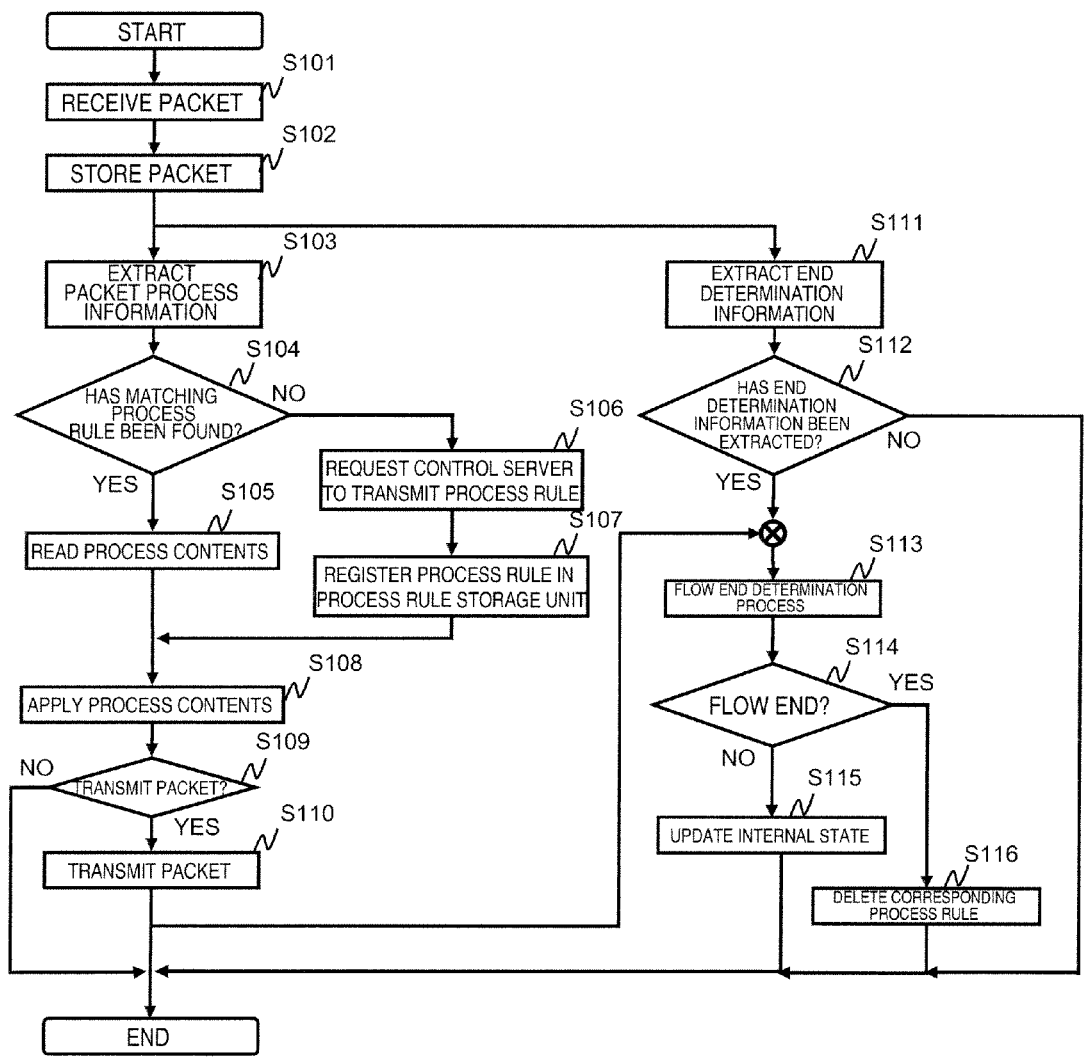
FIG. 3 is a flow chart of an operation according to the first exemplary embodiment of the present invention.

In FIG. 3, first, upon receiving a packet (step S101), the packet reception unit C10 stores the received packet in the packet storage unit C11 (step S102).

Next, the packet reception unit C10 notifies the packet process information extraction unit C12 and the end determination information extraction unit C17 of reception of the packet. Accordingly, two processes will be executed simultaneously (branches after step S102).

In the first process, the received packet is processed (steps S103 to S110). When notified by the packet reception unit C10 of reception of the packet, the packet process information extraction unit C12 extracts information for determining process contents to be applied to the packet from the packet storage unit C11 and transmits the process contents to the process rule search unit C14 (step S103).

Next, upon receiving the extracted information, the process rule search unit C14 searches the process rule storage unit C13 for a process rule matching the extracted information (step S104). If a process rule matching the extracted information is found, the process rule search unit C14 extracts actions (process contents) defined in the process rule and transmits the actions to the packet process unit C15 (step S105). If no process rule matching the extracted information is found, the process rule search unit C14 transmits the received packet or information extracted from the received packet to a predetermined control apparatus (controller; see FIG. 18) to request creation and transmission of a process rule (step S106). Upon receiving a process rule from the predetermined control apparatus (controller; see FIG. 18), the process rule search unit C14 registers the received process rule in the process rule storage unit C13, extracts actions (process contents) in the process rule, and outputs the actions to the packet process unit C15 (step S107).

Next, upon receiving the actions (process contents), the packet process unit C15 processes the packet stored in the packet storage unit C11 in accordance with the actions (process contents) (step S108). For example, the packet process unit C15 appropriately modifies fields of the packet and executes the above-described basic processes relating to communication.

Next, the packet process unit C15 determines whether to transmit the packet, depending on the actions (process contents), TTL information, or the like (step S109). If the packet process unit C15 determines that the packet needs to be transmitted, the packet process unit C15 instructs the packet forwarding unit C16 to transmit the packet.

Finally, the packet forwarding unit C16 reads the packet from the packet storage unit C11 and transmits the packet from a port specified by the actions (process contents) (step S110). In addition, the packet forwarding unit C16 notifies the end determination information extraction unit C17 of forwarding of the packet.

In the second process, a flow end determination is executed and an unnecessary process rule is deleted from the process rule storage unit C13 (steps S111 to S116).

First, when notified by the packet reception unit C10 of reception of a packet, the end determination information extraction unit C17 extracts certain information in the packet, which may include information necessary for determining a flow end, from the packet storage unit C11. Further, as in step S103, the end determination information extraction unit C17 extracts the information for determining process contents to be applied to the packet from the packet (step S111). If the extracted certain information in the packet does not include information necessary for determining a flow end, the flow end determination for the packet is ended (No in step S112).

If the extracted certain information in the packet includes information necessary for the end determination (Yes in step S112), the end determination information extraction unit C17 stands by until notified by the packet forwarding unit C16 of forwarding of the packet. Upon notified by the packet forwarding unit C16 of forwarding of the packet, the end determination information extraction unit C17 outputs the information necessary for determining a flow end and the information for determining process contents to be applied to the packet to the flow end check unit C18.

Next, the flow end check unit C18 determines whether the packet indicates a flow end, based on the information transmitted from the end determination information extraction unit C17 (step S113). If it is determined that the packet does not indicate a flow end (No in step S114), the flow end check unit C18 appropriately updates an internal state in the process rule in the process rule storage unit C13, in accordance with the determination contents (step S115). If, as a result of the determination, it is determined that the packet indicates a flow end (Yes in step S114), the flow end check unit C18 deletes the process rule confirming the flow end from the process rule storage unit C13 (step S116).

Thus, according to the present exemplary embodiment, since whether or not a flow to which a received packet belongs has ended is determined, an unnecessary process rule can be deleted promptly from the process rule storage unit C13. Thus, unnecessary reduction in the number of process rules that can be stored in the process rule storage unit C13 can be avoided. Therefore, the number of process rule setting requests transmitted to a predetermined control apparatus (controller; see FIG. 18) and the number of process rule updates can be reduced. These numbers are increased if the number of necessary process rules exceeds the maximum number of process rules that can be stored in the process rule storage unit C13. In addition, when an update operation of the process rule storage unit C13 is executed to assure QoS, unnecessary process rules can be eliminated from the operation.

Second Exemplary Embodiment

Figure 4:
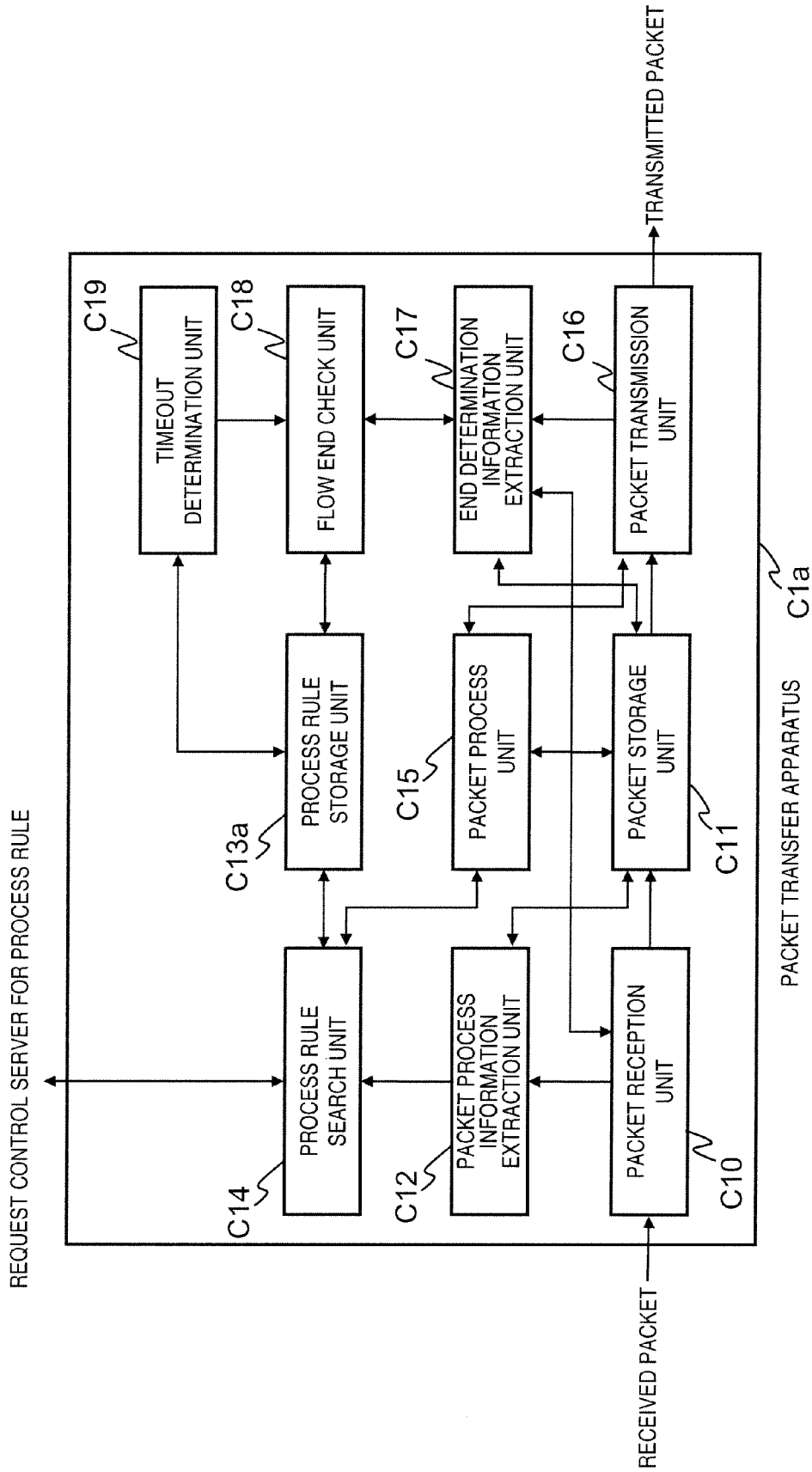
FIG. 4 is a block diagram of a configuration according to a second exemplary embodiment of the present invention.

Next, a second exemplary embodiment of the present invention, which is obtained by adding modifications to the above first exemplary embodiment, will be described in detail with reference to the drawings. FIG. 4 is a block diagram of a configuration according to the second exemplary embodiment of the present invention. A packet forwarding apparatus C1a according to the second exemplary embodiment of the present invention includes a timeout determination unit C19, in addition to the configuration of the first exemplary embodiment illustrated in FIG. 2. Hereinafter, the description will be made with a focus on the difference from the above first exemplary embodiment.

The timeout determination unit C19 monitors a certain field in the process rule storage unit C13 to determine a timeout. The timeout determination unit C19 determines whether to use the timeout as a trigger for an end determination.

The timeout determination unit C19 first monitors a certain field in the process rule storage unit C13 to determine a timeout. As the timeout monitoring method, an absolute value evaluation method may be used. In this method, the current time is compared with a certain field value. Alternatively, a relative value evaluation method may be used. In this method, a timeout is determined depending on whether a certain field value subject to count-up/count-down control exceeds or falls below a given value (timeout determination threshold). When the timeout determination unit C19 determines a timeout, the timeout determination unit C19 transmits a notification of generation of a timeout and information identifying the flow to the flow end check unit C18.

In addition to the functions according to the above first exemplary embodiment, a process rule storage unit C13a includes a function of updating a certain field used by the timeout determination unit C19 to execute the timeout determination.

In addition to the functions as described in the above first exemplary embodiment, upon receiving a notification of generation of a timeout from the timeout determination unit C19, the flow end check unit C18 executes an end determination on the flow. If the flow end check unit C18 determines an end, the flow end check unit C18 deletes a process rule corresponding to the flow from the process rule storage unit C13. This process rule deletion determination in which the timeout is used as a trigger may be executed independently from other processes. Alternatively, when the information necessary for determining a flow end is transmitted from the end determination information extraction unit C17, the process rule deletion determination may be executed in coordination with other processes. Alternatively, upon receiving the notification of generation of a timeout, the flow end check unit C18 may execute the determination based on the information necessary for determining a flow end transmitted from the end determination information extraction unit C17 and the timeout determination in coordination with each other.

As described above, according to the second exemplary embodiment of the present invention, a timeout is also considered to determine a flow end. Thus, process rules that are not used for a certain period of time can be deleted more actively from the process rule storage unit C13a. While the process rule storage unit C13a, the flow end check unit C18, and the timeout determination unit C19 may be arranged separately as illustrated in FIG. 4, these units C13a, C18, and C19 may be realized by a mechanism equivalent to that described in Non-Patent Documents 1 and 2 in which if a corresponding packet is not received during a period specified by a separately set expiration time, a corresponding entry is deleted.

Third Exemplary Embodiment

Figure 5:
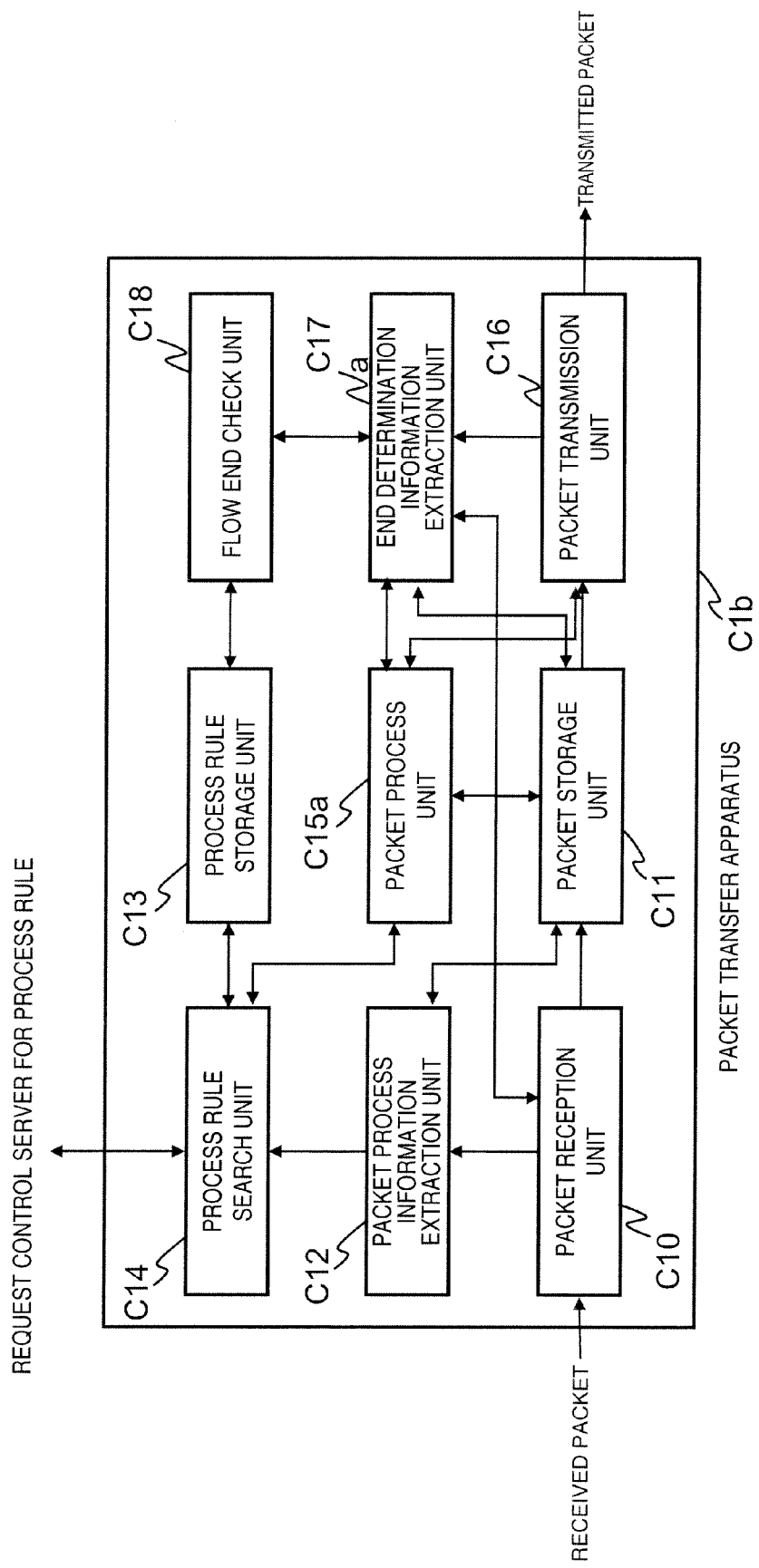
FIG. 5 is a block diagram of a configuration according to a third exemplary embodiment of the present invention.

Next, a third exemplary embodiment of the present invention, which is obtained by adding modifications to the above first exemplary embodiment, will be described in detail with reference to the drawings. FIG. 5 is a block diagram of a configuration according to the third exemplary embodiment of the present invention. FIG. 5 is different from FIG. 2 in that a packet process unit C15a and an end determination information extraction unit C17a are included and that a double-headed arrow representing communication between these units C15a and C17a is added. Other configurations are similar to those according to the first exemplary embodiment, and the following description will be made with a focus on only modified portions.

When executing a packet forwarding process, the packet process unit C15a first notifies the end determination information extraction unit C17a of completion of packet forwarding preparation and next requests the packet forwarding unit C16 to transmit the packet.

In addition to the operations described in the above first exemplary embodiment, upon receiving a notification of completion of packet forwarding preparation from the packet process unit C15a, the end determination information extraction unit C17a extracts certain information in the packet, which may include information necessary for determining a flow end, from the packet storage unit C11. If the end determination information extraction unit C17a determines that the certain information in the packet includes the information necessary for determining a flow end, the end determination information extraction unit C17a outputs the information for determining process contents to be applied to the packet (received packet header field information and reception status information (ingress port and the like) and the information determined to be necessary for determining a flow end to the flow end check unit C18.

Namely, according to the present exemplary embodiment, an unnecessary process rule can be deleted by executing a flow end determination at the time of packet reception and packet forwarding. Therefore, process rules can be reduced more actively, compared with the first exemplary embodiment.

Next, specific examples 1 to 3 will be described. In the examples 1 to 3, a flow end is determined by combining features of the above individual exemplary embodiments and using TCP (Transmission Control Protocol) flags.

SPECIFIC EXAMPLE 1

Figure 6:
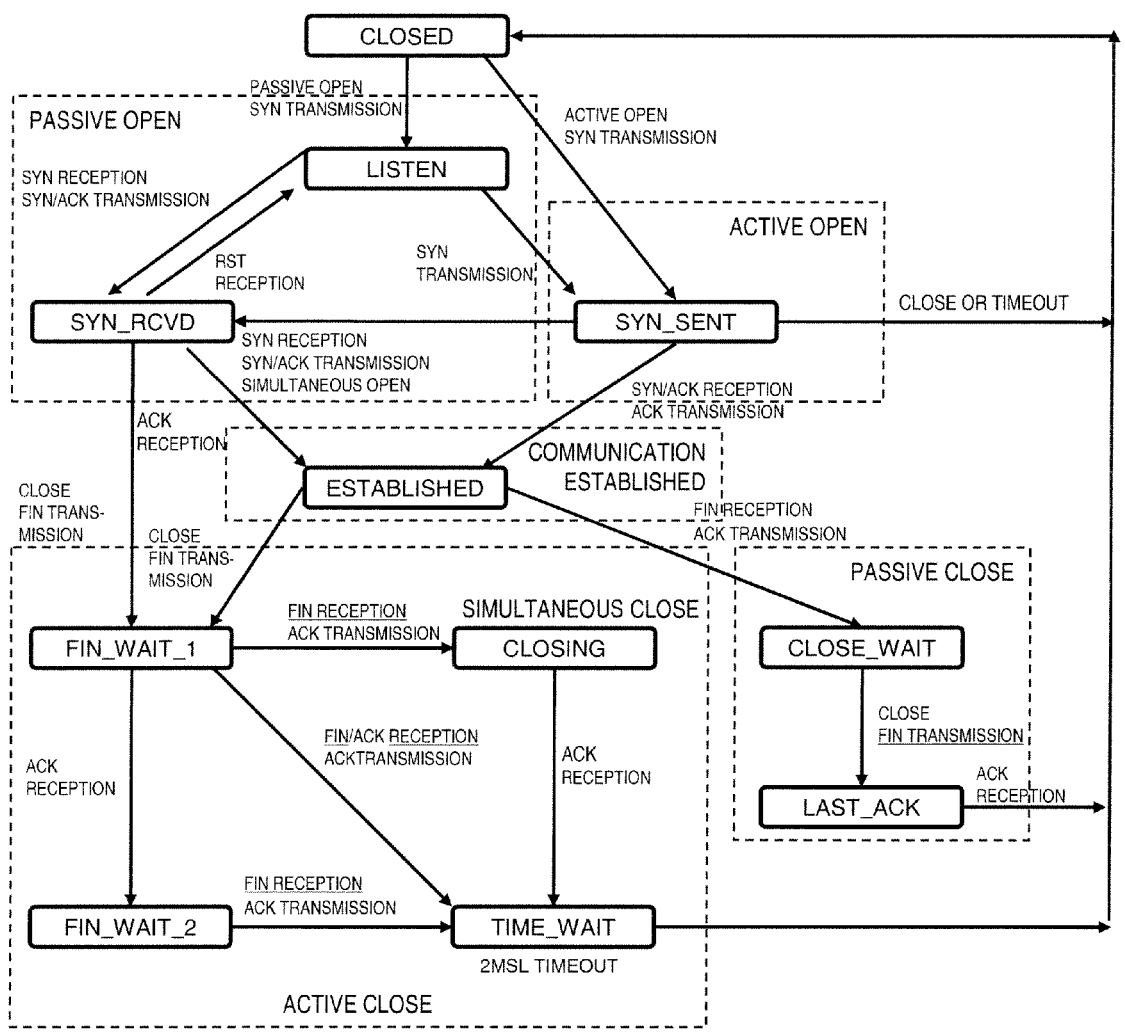
FIG. 6 is a state transition diagram of TCP connection.

FIG. 6 is a state transition diagram of TCP connection. "CLOSED" at the top of FIG. 6 represents the end of TCP communication, and portions connected thereto represent states prior to the end of TCP communication. Approximately 2MSL (MSL: Maximum Segment Lifetime) is the maximum amount of time required to reach the above "CLOSED," that is, if the packet forwarding apparatus stands by for approximately 2MSL after both FINs flow, the above "CLOSED" is reached. Thus, after a FIN is confirmed in either direction, if this 2MSL elapses, basically, a communication end can be determined. Even if the state does not change smoothly because of packet loss or the like (for example, even if an ACK packet does not arrive after "CLOSING"), a retransmitted packet is forwarded immediately after this 2MSL. Thus, the end of TCP communication can be determined if a new FIN packet is not received within the time corresponding to the 2MSL and a margin (2MSL+α) at longest.

Figure 7:
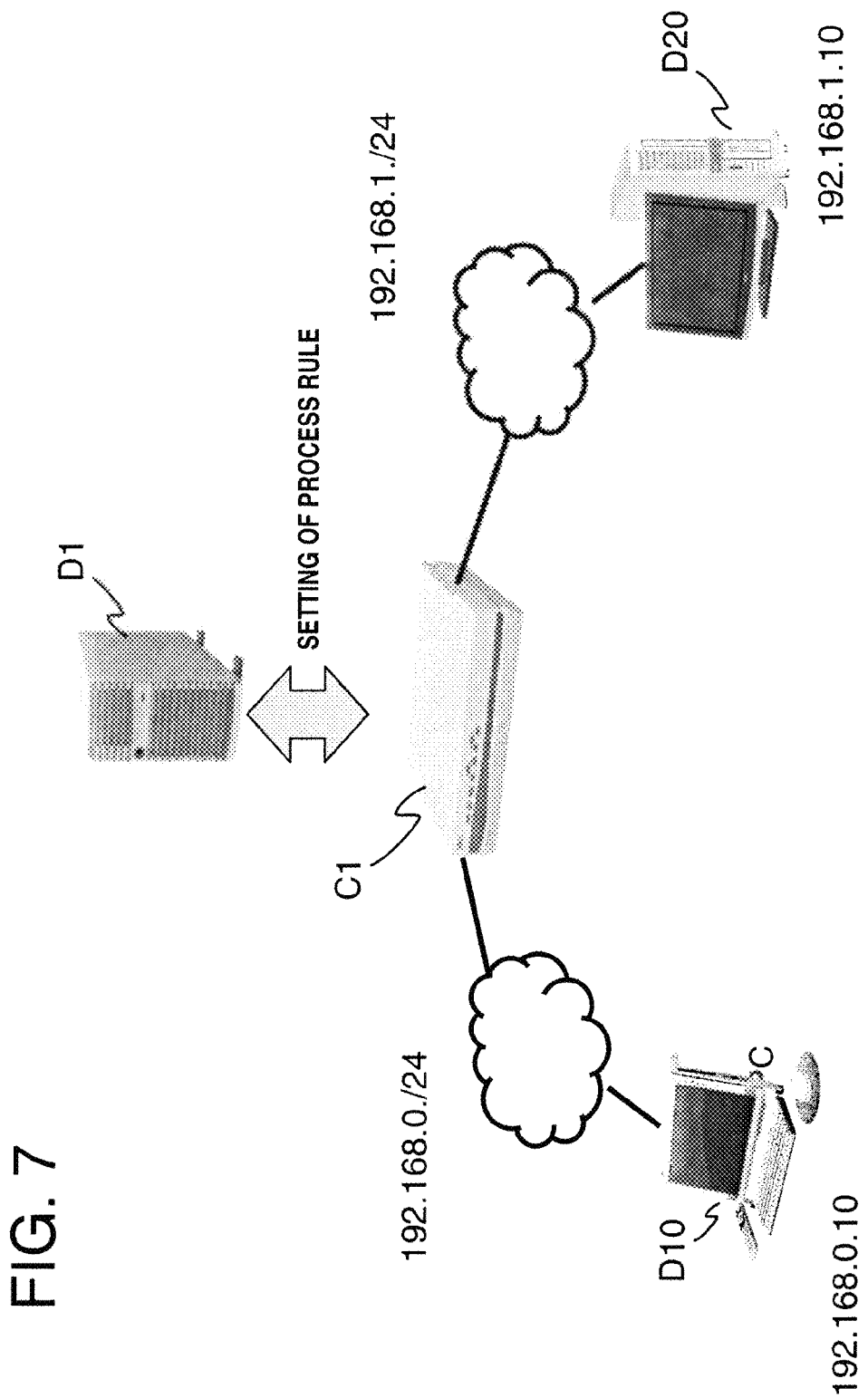
FIG. 7 illustrates a specific example of the present invention.

Hereinafter, the description will be made, assuming that a packet forwarding apparatus C1 according to the present invention relays TCP communication between a computer (client) D10 and a server D20 that use network configurations illustrated in FIG. 7. In the example of FIG. 7, the computer D10 belongs to a network represented by 192.168.0./24 and is set by 192.168.0.10. The server D20 belongs to a network represented by 192.168.1./24 and is set by 192.168.1.10. As in the case of the OpenFlow controller described in Non-Patent Documents 1 and 2, a control apparatus (controller) D1 is connected to the packet forwarding apparatus C1 via a dedicated channel and manages connection between the two networks. In the following description, the control apparatus (controller) D1 controls the packet forwarding apparatus C1 so that connection from other networks appears as communication from network number 1 (192.168.1.1) of the respective networks (see process rule actions in FIG. 19). In addition, in the present specific example, since FIN packets are monitored, the end determination information extraction unit C17 monitors a protocol stack, including: fields in which the TCP is determined; and the FIN flag in the TCP header.

Figure 8:
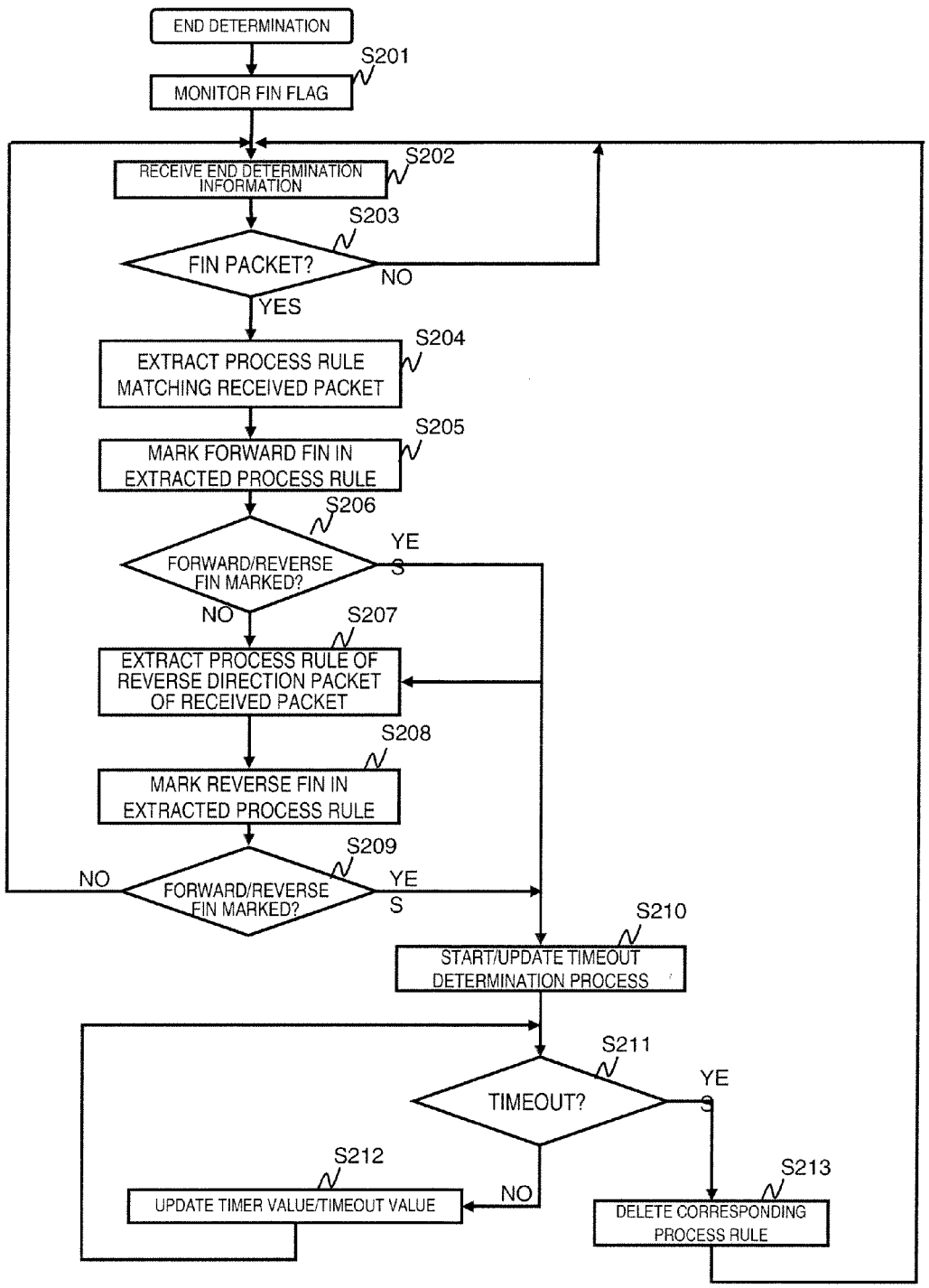
FIG. 8 is a flow chart illustrating the specific example of the present invention.

FIG. 8 is a flow chart of a flow end determination process using FIN flags. In FIG. 8, steps relating to a timeout determination are added to steps S111 to S116 in the flow chart in FIG. 3. Thus, the flow chart in FIG. 8 includes more detailed steps than the flow chart of FIG. 3. Hereinafter, operations will be described with reference to FIGS. 3, 6, and 8 and FIGS. 9 to 13. In practice, prior to TCP/IP communication, ARP (Address Resolution Protocol) communication is executed, and a process rule may be set in that stage. However, for ease of description, description of the ARP communication will be omitted. The following description will be made based on communication at the TCP/IP level.

First, the computer D10 starts communication with the server D20. For an initial establishment of communication, a packet (SYN) is inputted to the packet forwarding apparatus C1 (start of ACTIVE OPEN through SYN forwarding in FIG. 6). The packet reception unit C10 receives and stores this first packet in the packet storage unit C11 (steps S101 to S102 in FIG. 3).

The packet reception unit C10 notifies the packet process information extraction unit C12 and the end determination information extraction unit C17 of reception of the packet. The packet process information extraction unit C12 refers to the packet storage unit C11 and extracts information such as IP source and destination information that is necessary to search for a process rule (step S103 in FIG. 3). Hereinafter, a process corresponding to steps S103 to S110 in FIG. 3 will be executed.

Meanwhile, the end determination information extraction unit C17 refers to the packet storage unit C11 and monitors a TCP FIN flag. Since no FIN flag is set, an end determination is not executed on the packet. Thus, the flow end determination process from steps S111 to S116 in FIG. 3 is not executed.

Next, a process rule corresponding to the received packet is searched for. The packet process information extraction unit C12 transmits the extracted information (representing that the ingress port is 1; the source address is 192.168.0.10; the destination address is 192.168.1.10; and the protocol is TCP (the type is 0x0006)) to a process rule search unit C14. The process rule search unit C14 refers to the process rule storage unit C13. Since no process rule matching the packet exists, the process rule search unit C14 queries the control apparatus (controller) D1 (steps S104 and S106 in FIG. 3). The control apparatus (controller) D1 creates a process rule including process contents representing modification of the source IP and forward from a specified transport port and transmits the process rule to the packet forwarding apparatus C1. The process rule search unit C14 registers the process rule received from the control apparatus (controller) D1 as a new entry in the process rule storage unit C13 (step S107 in FIG. 3). At this stage, as illustrated in FIG. 9, a new process rule is added to the process rule storage unit C13.

Next, a packet forwarding process is started. The process rule search unit C14 transmits a searched process rule to the packet process unit C15. In accordance with the transmitted process rule, the packet process unit C15 executes modifications of the packet, such as IP address replacement and TTL reduction (step S108 in FIG. 3). If it is determined that the TTL is not ended and that the packet needs to be transmitted (Yes in step S109 in FIG. 3), the packet process unit C15 transmits an instruction to the packet forwarding unit C16 to transmit the received packet from port number 2 of the packet forwarding apparatus C1. If a configuration equivalent to that according to the third exemplary embodiment is used, the instruction is also transmitted to the end determination information extraction unit C17. However, since an end determination is not made on the packet because of the above reason, the process rule is not deleted.

In accordance with the above instruction, the packet forwarding unit C16 transmits the packet from port number 2. In this way, the first packet is transmitted.

Next, for an establishment of communication with the computer D10, an acknowledgement (SYN/ACK packet) is inputted to the packet forwarding apparatus C1 from the server D20 (SYN/ACK forwarding in FIG. 6). As in the case of the above establishment of communication from the computer D10 to the server D20, the process rule storage unit C13 is referred to. However, since no process rule matching the acknowledgement packet exists, the control apparatus (controller) D1 is queried, and a new process rule defining a process contents to be applied to a reverse-direction flow is added (steps S104, S106, and S107 in FIG. 3). At this stage, as illustrated in FIG. 10, a new process rule is added to the process rule storage unit C13.

Next, for an establishment of communication, the computer D10 transmits the final acknowledgement (ACK packet) to the server D20 (ACK forwarding in FIG. 6). At this point, a process rule matching the flow from the computer D10 to the server D20 is already registered in the process rule storage unit C13. Thus, the process rule search unit C14 extracts the process contents (actions) defined in the corresponding process rule from the process rule storage unit C13 (step S105). Subsequently, the packet exchanged between the computer D10 and the server D20 is modified and relayed as described above ("ESTABLISHED" in FIG. 6).

Subsequently, when ending the communication, the computer D10 transmits a FIN packet representing the end of the communication to the server D20 (start of ACTIVE CLOSE through FIN forwarding in FIG. 6). This FIN packet is inputted to the packet forwarding apparatus C1. The FIN packet is forwarded in the same way as the above ACK packet, description thereof will be omitted. Hereinafter, steps S111 to S116 in FIG. 3 will be described with reference to FIG. 8.

Upon receiving a notification that the packet has been received by the packet reception unit C10, the end determination information extraction unit C17 refers to the packet storage unit C11, monitors a TCP FIN flag, and finds a FIN flag (step S201 in FIG. 8).

Since a FIN flag is set, the end determination information extraction unit C17 determines that the packet includes information necessary for determining a flow end. Thus, the end determination information extraction unit C17 extracts information for identifying a process rule to be deleted (the ingress port is 1; the source address is 192.168.0.10; the destination is 192.168.1.10; and the protocol is TCP (the type is 0x0006)) and stands by until forwarding of the packet. Upon receiving a notification that the packet has been transmitted by the packet forwarding unit C16, the end determination information extraction unit C17 further extracts information for identifying a process rule to be deleted from the packet storage unit C11. Since the IP address is replaced, the extracted information for identifying a process rule to be deleted represents that the source address is 192.168.1.1; the destination is 192.168.1.10; and the protocol is TCP (the type is 0x0006). The information is used for marking of the reverse flow. The end determination information extraction unit C17 notifies the flow end check unit C18 of the notification that the FIN packet has been received and these items of information (step S202 in FIG. 8).

Upon receiving the above information from the end determination information extraction unit C17, the flow end check unit C18 checks whether or not a FIN flag is set in a predetermined packet header position (step S203). These steps correspond to steps S111 to S114 in FIG. 3.

At this point, since a FIN packet has been transmitted, the flow end check unit C18 uses the information for identifying a process rule to be deleted as a key, extracts a process rule from the process rule storage unit C13, and marks a FIN packet reception flag (S204 to S205 in FIG. 8). This process corresponds to the internal state update process in step S115 in FIG. 3.

Next, the flow end check unit C18 checks whether forward- and reverse-direction FINs are marked in the corresponding process rule. Since only the forward-direction FIN is marked at this point, the operation proceeds to the next process (No in S206 in FIG. 8).

Next, marking of the reverse-direction flow is executed. The flow end check unit C18 extracts a process rule corresponding to the information for identifying a process rule to be deleted (the source and the destination are reversed and matched) and marks the reverse-direction FIN packet reception flag (steps S207 to S208 in FIG. 8). At this stage, as illustrated in FIG. 11, a FIN flag and a reverse FIN flag are set in the respective process rules in the process rule storage unit C13. At this point, since both the forward- and reverse-direction FIN flags are not marked in the corresponding process rules, the packet forwarding apparatus C1 stands by until reception of the next packet, instead of immediately deleting the process rules (No in step S209 in FIG. 8).

Next, after an ACK reply in response to the FIN packet from the computer D10 is forwarded from the server D20 in the same way as the above normal packet (start of PASSIVE CLOSE in FIG. 6), the server D20 transmits a FIN packet to the computer D10. When this FIN packet is inputted to the packet forwarding apparatus C1, the flow end determination process from steps S111 to S116 is started, as in the case of the above start of ACTIVE CLOSE.

Upon receiving a notification that the packet has been received from the packet reception unit C10, the end determination information extraction unit C17 refers to the packet storage unit C11, monitors a TCP FIN flag, and finds a FIN packet (step S201 in FIG. 8).

Since a FIN flag is set, the end determination information extraction unit C17 determines that the packet includes information necessary for determining a flow end. Thus, the end determination information extraction unit C17 extracts information for identifying a process rule to be deleted (the ingress port is 2; the source address is 192.168.1.10; the destination is 192.168.1.1; and the protocol is TCP (the type is 0x0006)) and stands by until the packet is transmitted. Upon receiving a notification that the packet has been transmitted from the packet forwarding unit C16, the end determination information extraction unit C17 further extracts information for identifying a modified process rule from the packet storage unit C11. Since the IP address is replaced, the extracted information for identifying a modified process rule represents that the source address is 192.168.1.10; the destination is 192.168.0.10; and the protocol is TCP (the type is 0x0006). The information is used for marking of the reverse flow. The end determination information extraction unit C17 notifies the flow end check unit C18 of the notification that the FIN packet has been received and these items of information (step S202 in FIG. 8).

Upon receiving the above information from the end determination information extraction unit C17, the flow end check unit C18 checks whether or not a FIN flag is set in a predetermined packet header position (step S203 in FIG. 8). These steps correspond to steps S111 to S114 in FIG. 3.

At this point, since a FIN packet has been transmitted, the flow end check unit C18 uses the information for identifying a process rule to be deleted as a key, extracts the process rule (process rule corresponding to ingress port 2 in FIG. 11) from the process rule storage unit C13, and marks a FIN packet reception flag (steps S204 to S205 in FIG. 8). This process corresponds to the internal state update process in step S115 in FIG. 3.

Next, the flow end check unit C18 checks whether the forward- and reverse-direction FIN flags are marked in this corresponding process rule. At this point, since it is confirmed that the forward- and reverse-direction FIN flags are marked, the flow end check unit C18 sets 2MSL (+α) as the final timeout period of the corresponding process rule (process rule corresponding to ingress port 2 in FIG. 12) (step S210 in FIG. 8). The timeout period includes a predetermined margin α, which is defined so that the determination will not be made in an excessively strict manner.

Next, marking of the reverse-direction flow is executed. The flow end check unit C18 extracts a process rule corresponding to the information for identifying a process rule to be deleted (the source and the destination are reversed and matched) and marks the reverse-direction FIN packet reception flag (steps S207 to S208 in FIG. 8).

As a result, since it is confirmed that the forward- and reverse-direction FIN flags are marked, the flow end check unit C18 sets 2MSL (+α) as the timeout period of the corresponding process rule (process rule corresponding to ingress port 1 in FIG. 12) (step S210 in FIG. 8). At this point, as illustrated in FIG. 12, the timeout period 2MSL is set in the corresponding process rule of the process rule storage unit C13.

Since these timeout values have been set, the timeout determination unit C19 starts monitoring of a timeout (steps S211 and 212 in FIG. 8). In this monitoring of a timeout, a timer value may be updated and compared with a timeout value. Alternatively, a timeout value may be updated and compared with a predetermined threshold.

During the above timeout determination, the final ACK is transmitted and received. However, if re-forwarding of a FIN packet is executed without forwarding/reception of the final ACK, in accordance with the above process after step S202 in FIG. 8, the timeout value setting process is executed again and a new timeout value is set.

If a timeout is finally determined (Yes in step S211 in FIG. 8), the timeout determination unit C19 notifies the flow end check unit C18 of the determination of a timeout. In response, the flow end check unit C18 deletes the corresponding process rules from the process rule storage unit C13 (step S116 in FIG. 3 and step S213 in FIG. 8). At this stage, as illustrated in FIG. 13, the corresponding process rules are deleted from the process rule storage unit C13.

Regarding the monitoring of a timeout in steps S211 and 212 in FIG. 8, the timeout determination is continuously executed on the corresponding process rules. If the packet forwarding apparatus receives a different FIN packet during the timeout determination, the packet forwarding apparatus separately processes this FIN packet in accordance with the end determination flow from step S201.

As described above, by using FIN flags and reliably detecting a flow end, unnecessary process rules can be deleted from the process rule storage unit.

SPECIFIC EXAMPLE 2

Referring back to the state transition diagram of TCP connection in FIG. 6, there are two cases where "CLOSED" at the top of FIG. 6 is reached without a state transition involving FIN flags. One case arises when the session is closed from SYN_SENT, which is reached when a SYN packet in which a SYN flag is marked is transmitted. The other case arises when a timeout is generated. In such case, while the packet forwarding apparatus cannot monitor the closed session, the packet forwarding apparatus can confirm a timeout in the following way. In the present specific example, a flow end is determined by this timeout.

In the present specific example, if a SYN/ACK packet does not flow in a direction opposite to the SYN packet flow direction within a predetermined time (from "SYN_RCVD" to "SYN_SENT" in FIG. 6), a timeout is determined.

Figure 14:
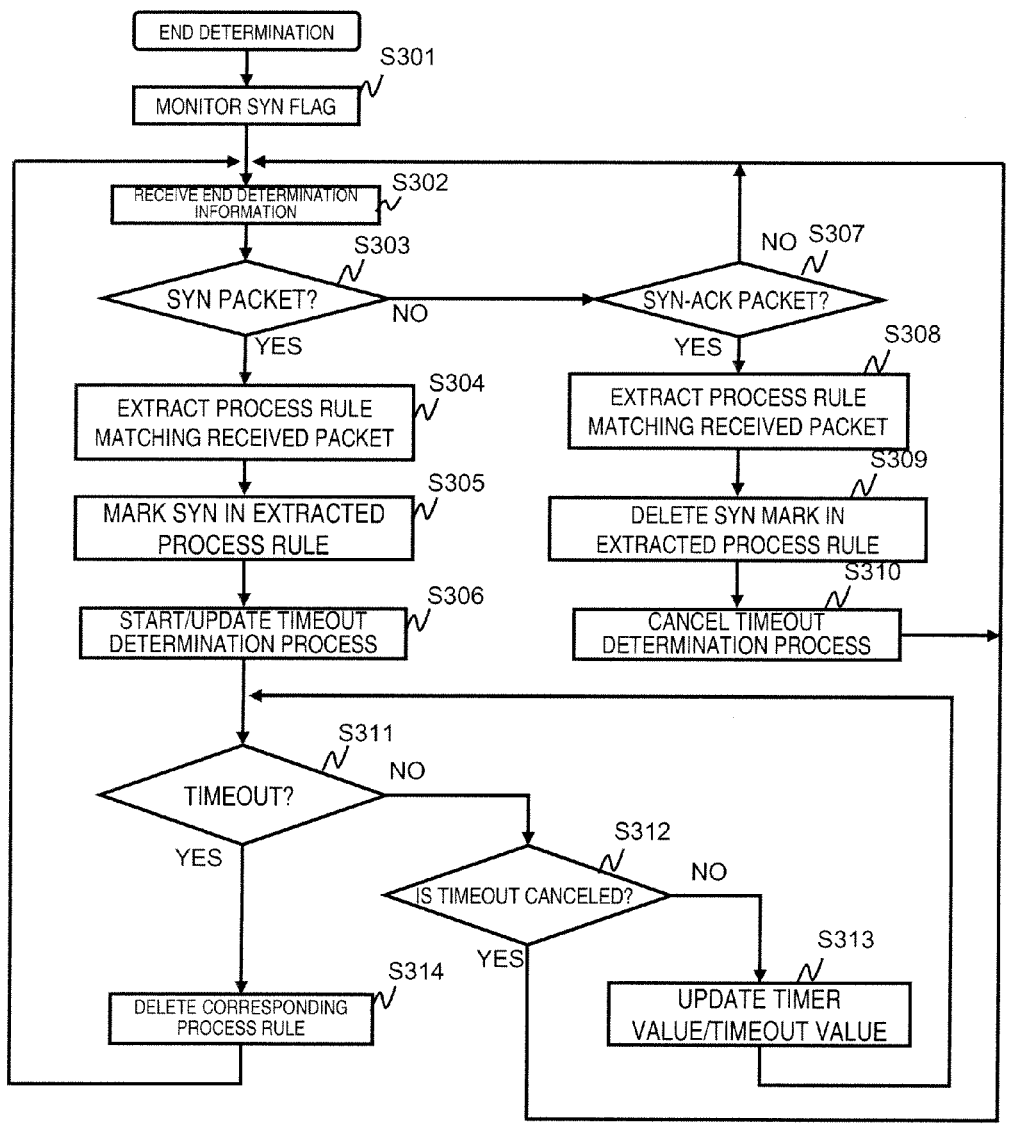
FIG. 14 is a flow chart illustrating a second specific example of the present invention.

FIG. 14 is a flow chart illustrating a flow end determination process using a SYN flag. Since the basic operations are the same as those of the above specific example 1, the following description will be made with a focus on the difference.

In FIG. 14, upon receiving a notification that the packet has been received by the packet reception unit C10, the end determination information extraction unit C17 refers to the packet storage, unit C11, monitors a TCP SYN flag, and finds a SYN packet (step S301 in FIG. 14).

Since a SYN flag is set, the end determination information extraction unit C17 determines that the packet includes information necessary for determining a flow end. Thus, the end determination information extraction unit C17 extracts information for identifying a process rule to be deleted (the ingress port is 2; the source address is 192.168.1.10; the destination is 192.168.1.1; and the protocol is TCP (the type is 0x0006)) and stands by until the packet is transmitted. Upon receiving a notification that the packet has been transmitted by the packet forwarding unit C16, the end determination information extraction unit C17 further extracts information for identifying a modified process rule from the packet storage unit C11. Since the IP address is replaced, the extracted information for identifying a process rule represents that the source address is 192.168.1.10; the destination is 192.168.0.10; and the protocol is TCP (the type is 0x0006). The information is used for marking of the reverse flow. The end determination information extraction unit C17 notifies the flow end check unit C18 of the notification that the SYN packet has been received and these items of information (step S302 in FIG. 14).

Upon receiving the above information from the end determination information extraction unit C17, the flow end check unit C18 checks whether a SYN flag is set in a predetermined packet header position and an ACK flag is not marked (step S303 in FIG. 14). These steps correspond to steps S111 to S114 in FIG. 3.

If a SYN packet is confirmed, the flow end check unit C18 uses the information for identifying a process rule to be deleted as a key, extracts a process rule from the process rule storage unit C13, and marks a SYN packet reception flag (steps S304 to S305 in FIG. 14). This process corresponds to the internal state update process in step S115 in FIG. 3.

Next, the flow end check unit C18 sets a reception timeout period for a SYN/ACK packet in the process rule storage unit C13 and causes the timeout determination unit C19 to start a timeout determination process (step S306 in FIG. 14). At this stage, as illustrated in FIG. 15, a timeout period 2MSL is set in the corresponding process rule of the process rule storage unit C13.

If, in step S303, the flow end check unit C18 determines that the packet is not a SYN packet, the flow end check unit C18 checks whether the packet is a SYN/ACK packet, namely, whether both a SYN flag and an ACK flag are marked (step S307 in FIG. 14).

If a SYN/ACK packet is confirmed, the flow end check unit C18 uses the information for identifying a process rule to be deleted as a key, extracts a process rule from the process rule storage unit C13, and deletes a SYN packet reception flag mark (steps S308 to S309 in FIG. 14).

Next, the flow end check unit C18 also deletes a timeout period from the process rule storage unit C13. In this way, a timeout determination process by the timeout determination unit C19 of the process rule is canceled (step S310 in FIG. 14).

After the timeout determination process is started in step S306 in FIG. 14, if a timeout is finally determined (Yes in step S311 in FIG. 14), the timeout determination unit C19 notifies the flow end check unit C18 of the determination of a timeout. In response, the flow end check unit C18 deletes the corresponding process rule from the process rule storage unit C13 (step S116 in FIG. 3 and step S314 in FIG. 14).

The above timeout determination process is continued until the timeout determination process is canceled (No in step S312 in FIG. 14).

Thus, since a flow end can be detected reliably even with a SYN flag, an unnecessary process rule can be deleted from the process rule storage unit.

SPECIFIC EXAMPLE 3

Next, a third specific example in which a flow end determination is executed by using a TCP RST (reset) flag will be described.

Referring back to the state transition diagram of TCP connection in FIG. 6, there is a transition from "SYN_RCVD," which is a communication establishment standby state, to "LISTEN," which is a communication standby state. A TCP RST (reset) flag signifies release of connection and retry of communication. Namely, since a RST packet in which this RST flag is set signifies invalidation of communication, by detecting this RST flag, a flow end can be determined.

Figure 16:
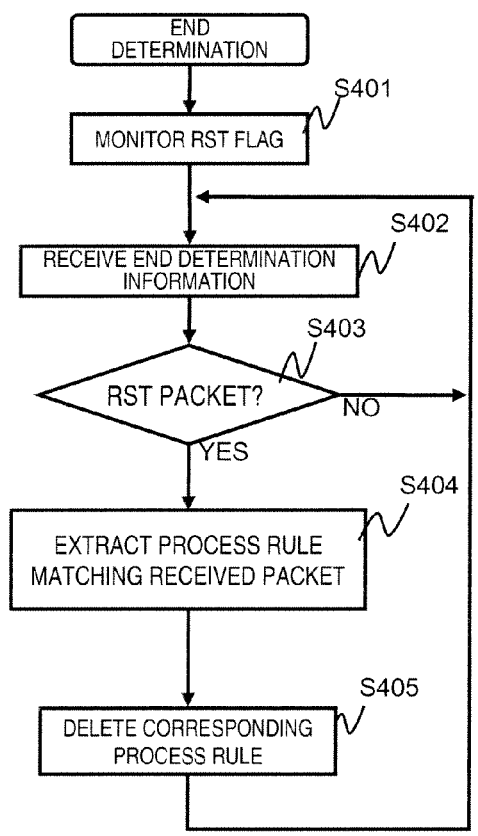
FIG. 16 is a flow chart illustrating a third specific example of the present invention.

FIG. 16 is a first flow chart illustrating a flow end determination process using a RST flag. Since the basic operations are the same as those of the above specific example 1, the following description will be made with a focus on the difference.

In FIG. 16, upon receiving a notification that the packet has been received by the packet reception unit C10, the end determination information extraction unit C17 refers to the packet storage unit C11, monitors a TCP RST flag, and finds a RST packet (step S401 in FIG. 16).

Since a RST flag is set, the end determination information extraction unit C17 determines that the packet includes information necessary for determining a flow end. Thus, the end determination information extraction unit C17 extracts information for identifying a process rule to be deleted (the ingress port is 2; the source address is 192.168.1.10; the destination is 192.168.1.1; and the protocol is TCP (the type is 0x0006)) and stands by until the packet is transmitted. Upon receiving a notification that the packet has been transmitted from the packet forwarding unit C16, the end determination information extraction unit C17 notifies the flow end check unit C18 of the notification that the RST packet has been received and these items of information (step S402 in FIG. 16).

Upon receiving the above information from the end determination information extraction unit C17, the flow end check unit C18 checks whether a RST flag is set in a predetermined packet header position (step S403 in FIG. 16). These steps correspond to the steps S111 to S114 in FIG. 3.

If it is confirmed that the packet is a RST packet, the flow end check unit C18 uses the information for identifying a process rule to be deleted as a key, to extract and delete a process rule from the process rule storage unit C13 (steps S404 to S405 in FIG. 16).

Thus, since a flow end can be detected reliably even with a RST flag, an unnecessary process rule can be deleted from the process rule storage unit.

Figure 17:
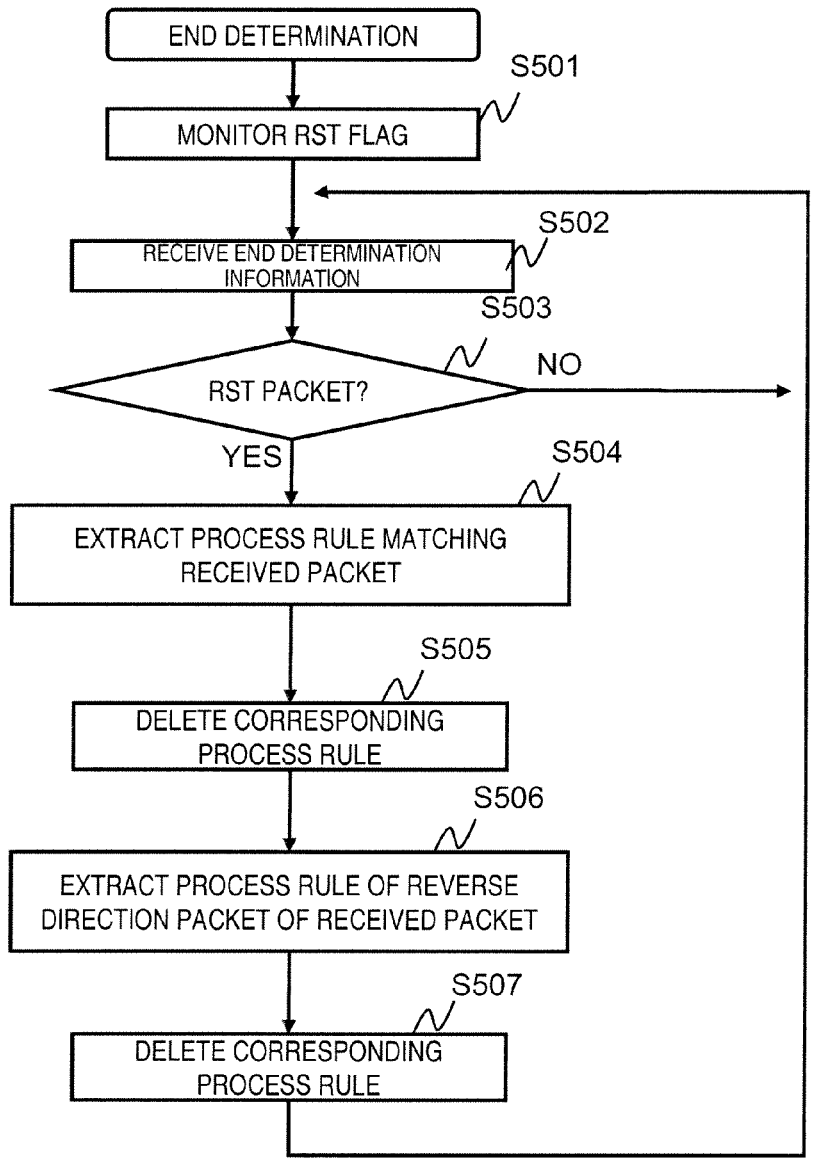
FIG. 17 is a second flow chart illustrating the third specific example of the present invention.

Since this RST flag signifies invalidation of communication, a reverse-direction flow can also be deleted. FIG. 17 is a flow chart of an operation of determining a flow end with a RST flag and deleting a reverse-direction process rule. Since the basic operations are the same as those of the above specific example 1, the following description will be made with a focus on the difference.

In FIG. 17, upon receiving a notification that the packet has been received by the packet reception unit C10, the end determination information extraction unit C17 refers to the packet storage unit C11, monitors a TCP RST flag, and finds a RST packet (step S501 in FIG. 17).

Since a RST flag is set, the end determination information extraction unit C17 determines that the packet includes information necessary for determining a flow end. Thus, the end determination information extraction unit C17 extracts information for identifying a process rule to be deleted (the ingress port is 2; the source address is 192.168.1.10; the destination is 192.168.1.1; and the protocol is TCP (the type is 0x0006)) and stands by until the packet is transmitted. Upon receiving a notification that the packet has been transmitted by the packet forwarding unit C16, the end determination information extraction unit C17 extracts information for identifying a modified process rule from the packet storage unit C11. Since the IP address is replaced, the extracted information for identifying a process rule represents that the source address is 192.168.1.10; the destination is 192.168.0.10; and the protocol is TCP (the type is 0x0006). The information is used for deletion of the reverse flow. The end determination information extraction unit C17 notifies the flow end check unit C18 of the notification that the RST packet has been received and these items of information (step S502 in FIG. 17).

Upon receiving the above information from the end determination information extraction unit C17, the flow end check unit C18 checks whether a RST flag is set in a predetermined packet header position (step S503 in FIG. 17).

If it is confirmed that the packet is a RST packet, the flow end check unit C18 uses the information for identifying a process rule to be deleted as a key, to extract and delete a process rule from the process rule storage unit C13 (steps S504 to S505 in FIG. 17).

In addition, the flow end check unit C18 uses the information for identifying a modified process rule (corresponding to a reverse-direction flow) as a key, to extract and delete a process rule from the process rule storage unit C13 (steps S506 to S507 in FIG. 17).

Thus, by using a RST packet, the process rules corresponding to both the forward- and reverse-direction flows can be deleted from the process rule storage unit.

While preferred exemplary embodiments of the present invention and specific examples thereof have thus been described, the present invention is not limited thereto. Further variations, substitutions, or adjustments can be made without departing from the basic technical concept of the present invention.

For example, in a specific example of the present invention, certain TCP flags are monitored. A single packet forwarding apparatus can monitor these flags in a parallel fashion. For example, after a packet that triggers a flow end is detected, the above process may be allowed to branch to the above FIGS. 8, 14, and 16 (17) to realize parallel monitoring.

While the specific examples of the present invention have been described mainly based on the TCP, the present invention is applicable to all the connection-type protocols where end information fields are observable. For example, a flow end can be determined based on the E-bit in a DATA chunk in the SCTP (Stream Control Transmission Protocol).

Further, for example, a flow end can be determined when a Connection attribute in an HTTP (Hypertext Transfer Protocol) header detects Close and forwarding of a corresponding HTTP message is confirmed.

Further, for example, in an environment where an IP (Internet Protocol) packet train is deemed as a single flow, since a packet end can be determined by an IP MF (More Fragments) flag, a flow end can be determined. The entire disclosures of the above Non-Patent Documents are incorporated herein by reference thereto. Modifications and adjustments of the exemplary embodiments and examples are possible within the scope of the overall disclosure (including claims) of the present invention and based on the basic technical concept of the invention. Various combinations and selections of various disclosed elements are possible within the scope of the claims of the present invention. That is, the present invention of course includes various variations and modifications that could be made by those skilled in the art according to the overall disclosure including the claims and the technical concept.

INDUSTRIAL APPLICABILITY

The present invention is applicable to a packet forwarding apparatus such as a HUB or a switch having a storage region for storing process rules.

What is claimed is:
1. A packet forwarding apparatus, comprising:
  a process rule storage unit that stores process rules defining a process content for each flow;
  a packet process unit that executes processing a received packet by using a process rule matching the received packet among the process rules;
  an end determination information extraction unit that extracts information for checking a flow end from the received packet;

a flow end check unit that deletes, when a flow end is checked based on the extracted information, a process rule corresponding to the flow; and a control apparatus that controls the packet forwarding apparatus, wherein the control apparatus centrally controls the packet forwarding apparatus including the process rule storage unit, the packet process unit, the end determination information extraction unit, and the flow end check unit, wherein the control apparatus controls a process rule creation and deletion, wherein the end determination information extraction unit detects the flow end and a flow end check unit deletes the process rule corresponding to the flow without instruction from the control apparatus, and wherein when ending communication, the control apparatus executes a communication closing procedure.

2. The packet forwarding apparatus according to claim 1, further comprising:

a timeout determination unit that executes a timeout determination on a process rule stored in the process rule storage unit, wherein the flow end check unit causes the timeout determination unit to start a timeout determination based on the information extracted by the end determination information extraction unit and deletes a process rule on which a timeout is determined by the timeout determination unit, wherein the timeout is from receiving the information that causes the communication closing procedure.

3. The packet forwarding apparatus according to claim 2, further comprising:

a packet storage unit that stores a received packet, wherein the end determination information extraction unit extracts, from the packet storage unit, information for identifying process rules corresponding to a flow to which a received packet belongs and a reverse-direction flow of the flow, respectively, and causes the flow end check unit to determine whether to delete the process rules in both directions.

4. The packet forwarding apparatus according to claim 2, wherein the flow end check unit uses at least one of a TCP (Transmission Control Protocol) FIN flag, RST flag, and SYN flag extracted by the end determination information extraction unit to determine a flow end.

5. A communication system, comprising:
the packet forwarding apparatus according to claim 2; and
the control apparatus setting a process rule in the packet forwarding apparatus.

6. The packet forwarding apparatus according to claim 1, further comprising:

a packet storage unit that stores a received packet, wherein the end determination information extraction unit extracts, from the packet storage unit, information for identifying process rules corresponding to a flow to which a received packet belongs and a reverse-direction flow of the flow, respectively, and causes the flow end check unit to determine whether to delete the process rules in both directions.

7. The packet forwarding apparatus according to claim 6, wherein the flow end check unit uses at least one of a TCP (Transmission Control Protocol) FIN flag, RST flag, and SYN flag extracted by the end determination information extraction unit to determine a flow end.

8. A communication system, comprising:
the packet forwarding apparatus according to claim 6; and
the control apparatus setting a process rule in the packet forwarding apparatus.

9. The packet forwarding apparatus according to claim 1, wherein the flow end check unit uses at least one of a TCP (Transmission Control Protocol) FIN flag, RST flag, and SYN flag extracted by the end determination information extraction unit to determine a flow end.

10. A communication system, comprising:
the packet forwarding apparatus according to claim 9; and
the control apparatus setting a process rule in the packet forwarding apparatus.

11. A communication system, comprising:
the packet forwarding apparatus according to claim 1; and
the control apparatus setting a process rule in the packet forwarding apparatus.

12. A process rule update method, causing a packet forwarding apparatus including a process rule storage unit that stores process rules defining a process content for each flow; and a packet process unit that executes processing a received packet by using a process rule matching the received packet among the process rules to execute the process rule update method, the process rule update method comprising:

extracting information for checking a flow end from the received packet;

deleting, when a flow end is checked based on the extracted information, a process rule corresponding to the flow from the process rule storage unit, wherein the extracting and deleting is controlled by a control apparatus that sets a process rule in the packet forwarding apparatus, wherein centrally controlling, by the control apparatus, the packet forwarding apparatus including the process rule storage unit the packet process unit, the extracting of information, and the deleting of the process rule, wherein the control apparatus controls a process rule creation and deletion; and detecting, by an end determination information extraction unit, the flow end and a flow end check unit deletes the process rule corresponding to the flow without instruction from the control apparatus, and wherein when ending communication, the control apparatus executes a communication closing procedure.

13. The process rule update method according to claim 12, wherein the packet forwarding apparatus starts a timeout determination based on the information for checking a flow end and deletes a process rule on which a timeout is determined, and wherein the timeout is from receiving the information that causes the communication closing procedure.

14. The process rule update method according to claim 13, wherein the packet forwarding apparatus extracts information for identifying process rules corresponding to a flow to which a received packet belongs and a reverse-direction flow of the flow from the received packet and a received packet modified in accordance with the process rule, respectively, and determines whether to delete the process rules in both directions.

15. The process rule update method according to claim 13, wherein a flow end is determined by at least one of a TCP (Transmission Control Protocol) FIN flag, RST flag, and SYN flag.

16. The process rule update method according to claim 12, wherein the packet forwarding apparatus extracts information for identifying process rules corresponding to a flow to which a received packet belongs and a reverse-direction flow of the flow from the received packet and a received packet modified in accordance with the process rule, respectively, and determines whether to delete the process rules in both directions.

17. The process rule update method according to claim 16, wherein a flow end is determined by at least one of a TCP (Transmission Control Protocol) FIN flag, RST flag, and SYN flag.

18. The process rule update method according to claim 12, wherein a flow end is determined by at least one of a TCP (Transmission Control Protocol) FIN flag, RST flag, and SYN flag.

19. A non-transitory computer-readable recording medium storing thereon a program, causing a computer forming a packet forwarding apparatus comprising: including a process rule storage unit that stores process rules defining a process content for each flow; and a packet process unit that executes processing a received packet by using a process rule matching a received packet among the process rules to execute a method, the method comprising:

extracting information for checking a flow end from the received packet; and deleting, when a flow end is checked based on the extracted information, a process rule corresponding to the flow from the process rule storage unit, wherein the extracting and deleting is controlled by a control apparatus that sets a process rule in the packet forwarding apparatus wherein centrally controlling, by a control apparatus, the packet forwarding apparatus, wherein the control apparatus controls a process rule creation and deletion; and detecting, by an end determination information extraction unit, the flow end and a flow end check unit deletes the process rule corresponding to the flow without instruction from the control apparatus, and wherein when ending communication, the control apparatus executes a communication closing procedure.

* * * * *